(12) United States Patent
Hatanaka et al.

(10) Patent No.: US 9,755,698 B2
(45) Date of Patent: Sep. 5, 2017

(54) WIRELESS POWER TRANSMISSION APPARATUS

(71) Applicant: NITTO DENKO CORPORATION, Ibaraki-shi, Osaka (JP)

(72) Inventors: Takezo Hatanaka, Ibaraki (JP); Hisashi Tsuda, Ibaraki (JP)

(73) Assignee: NITTO DENKO CORPORATION, Osaka (JP)

( * ) Notice: Subject to any disclaimer, the term of this patent is extended or adjusted under 35 U.S.C. 154(b) by 654 days.

(21) Appl. No.: 14/119,069

(22) PCT Filed: May 1, 2013

(86) PCT No.: PCT/JP2013/062697
§ 371 (c)(1),
(2) Date: Nov. 20, 2013

(87) PCT Pub. No.: WO2014/080647
PCT Pub. Date: May 30, 2014

(65) Prior Publication Data
US 2014/0312705 A1     Oct. 23, 2014

(30) Foreign Application Priority Data

Nov. 26, 2012  (JP) .................................. 2012-257524

(51) Int. Cl.
*H01F 5/00* (2006.01)
*H04B 5/00* (2006.01)
(Continued)

(52) U.S. Cl.
CPC ............. *H04B 5/0037* (2013.01); *H01F 5/00* (2013.01); *H01F 38/14* (2013.01); *H02J 17/00* (2013.01)

(58) Field of Classification Search
None
See application file for complete search history.

(56) References Cited

U.S. PATENT DOCUMENTS 7,218,196 B2    5/2007  Nakao et al.
2009/0212637 A1*  8/2009  Baarman ............... H01F 7/0247
                                                 307/104
(Continued)

FOREIGN PATENT DOCUMENTS

CN      102656648 A     9/2012
EP      2512006 A1      10/2012
(Continued)

OTHER PUBLICATIONS

Jun. 4, 2013 Written Opinion issued in International Patent Application No. PCT/JP2013/062697.
(Continued)

*Primary Examiner* — Jared Fureman
*Assistant Examiner* — Aqeel Bukhari
(74) *Attorney, Agent, or Firm* — Oliff PLC

(57) ABSTRACT

A power-supplying module and a power-receiving module are positioned so that a coil surface of a power-supplying resonator in the power-supplying module and a coil surface of a power-receiving resonator in the power-receiving module face each other. On the inner circumferential surface sides of the coils of the power-supplying resonator and the power-receiving resonator, cylindrical magnetic members and which cover the entire inner circumferential surfaces of the coil of the power-supplying resonator and the coil of the power-receiving resonator are arranged. When power transmission between the power-supplying resonator and the power-receiving resonator is performed, while varying the magnetic field, magnetic field occurring around the power-supplying resonator and the power-receiving resonator is shielded by the magnetic members. This improves power transmission efficiency of power transmitted from the power-supplying module to the power-receiving module, as compared with a case of arranging no magnetic members.

9 Claims, 29 Drawing Sheets

(51) Int. Cl.
*H02J 17/00* (2006.01)
*H01F 38/14* (2006.01)

(56) References Cited

U.S. PATENT DOCUMENTS

| | | |
|---|---|---|
| 2010/0123452 A1 | 5/2010 | Amano et al. |
| 2010/0244580 A1 | 9/2010 | Uchida et al. |
| 2010/0244582 A1 | 9/2010 | Yoshikawa |
| 2010/0244583 A1 | 9/2010 | Shimokawa |
| 2011/0254378 A1 | 10/2011 | Ichikawa et al. |
| 2011/0304216 A1 | 12/2011 | Baarman |
| 2012/0223594 A1* | 9/2012 | Gotani .................. H01F 38/14 307/104 |
| 2012/0229140 A1 | 9/2012 | Shimokawa |
| 2012/0242447 A1 | 9/2012 | Ichikawa |
| 2013/0005408 A1 | 1/2013 | Matsui et al. |
| 2013/0200717 A1* | 8/2013 | Bourilkov ............... H02J 7/025 307/104 |
| 2013/0249308 A1* | 9/2013 | Yeh ........................ H02J 7/025 307/104 |

FOREIGN PATENT DOCUMENTS

| | | |
|---|---|---|
| EP | 2515314 A1 | 10/2012 |
| JP | S60-254400 A | 12/1985 |
| JP | H08-83326 A | 3/1996 |
| JP | A 10-94180 | 4/1998 |
| JP | 2002246248 A | 8/2002 |
| JP | 3906708 B2 | 4/2007 |
| JP | 2008-312357 A | 12/2008 |
| JP | A 2010-124522 | 6/2010 |
| JP | A 2010-239769 | 10/2010 |
| JP | A 2010-239777 | 10/2010 |
| JP | A 2010-239848 | 10/2010 |
| JP | B2 4624768 | 2/2011 |
| JP | 2012-034445 A | 2/2012 |
| JP | 2012-157219 A | 8/2012 |
| TW | 201230586 A | 7/2012 |
| WO | 2010/041321 A1 | 4/2010 |
| WO | 2011/070637 A1 | 6/2011 |
| WO | 2011/074091 A1 | 6/2011 |
| WO | 2011/114527 A1 | 9/2011 |

OTHER PUBLICATIONS

Apr. 7, 2015 Written Opinion issued in Singapore Patent Application No. 2013087465.
May 8, 2015 Search Report issued in European Patent Application No. 13801968.2.
Aug. 29, 2014 Written Opinion issued in Singaporean Patent Application No. 2013087465.
Dec. 1, 2015 Office Action issued in Singaporean Patent Application No. 2013087465.
Jan. 26, 2016 Office Action issued in Japanese Patent Application No. 2012-257524.
Jun. 4, 2013 Search Report issued in International Patent Application No. PCT/JP2013/062697 (with translation).
Oct. 29, 2015 Office Action issued in Chinese Patent Application No. 201380001945.9.
Jun. 21, 2016 Office Action issued in Japanese Patent Application No. 2012-257524.
Nov. 24, 2016 Office Action issued in Koren Patent Application No. 10-2013-7031424.
Jan. 4, 2017 Office Action issed in Japanese Patent Application No. 2012-257524.
Dec. 30, 2016 Office Action issued in Chinese Patent Application No. 201380001945.9.
Oct. 18, 2016 Office Action issued in Taiwanese Patent Application No. 102115794.
May 29, 2017 Office Action issued in Koren Patent Application No. 10-2013-7031424.

* cited by examiner

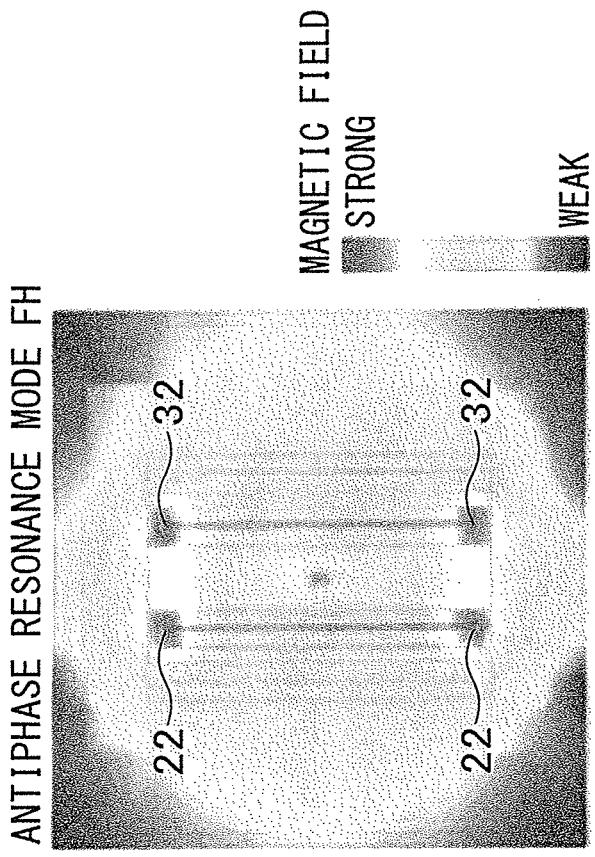
FIG.4(A) INPHASE RESONANCE MODE FL
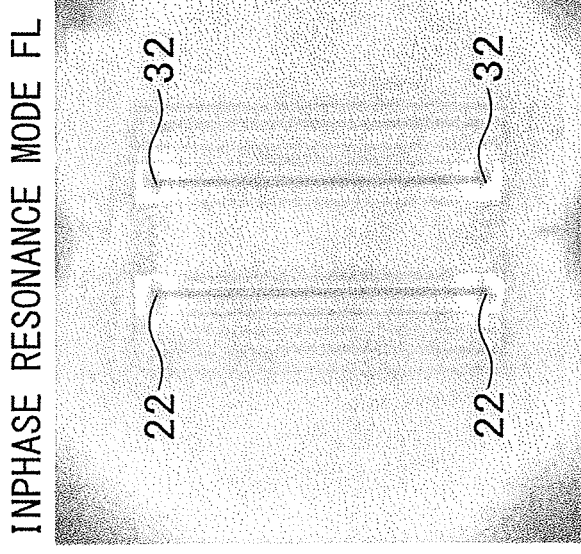
FIG.4(B) ANTIPHASE RESONANCE MODE FH

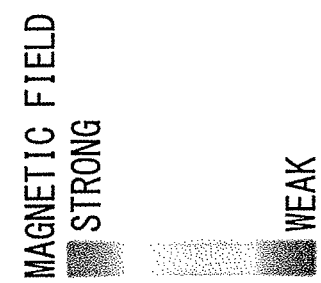
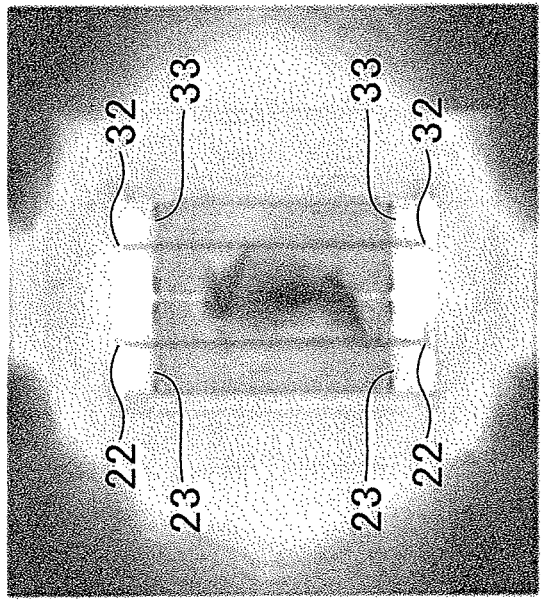
FIG.7(B) ANTIPHASE RESONANCE MODE FH
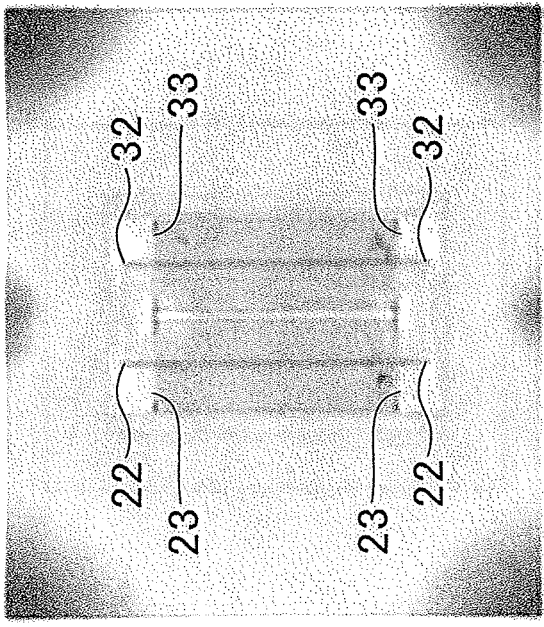
FIG.7(A) INPHASE RESONANCE MODE FL

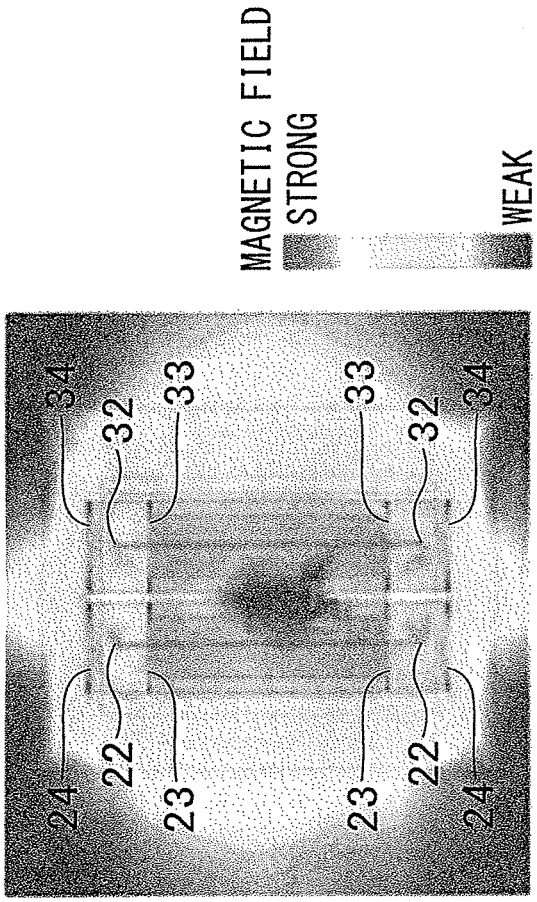
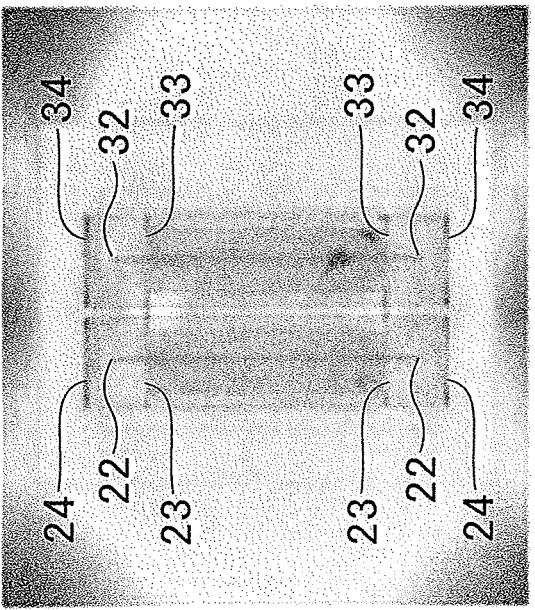

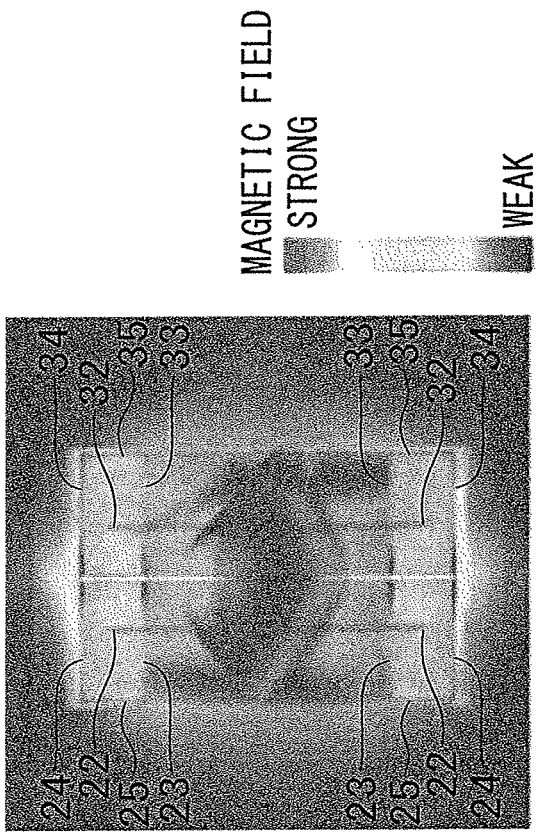
FIG.13(A) INPHASE RESONANCE MODE FL
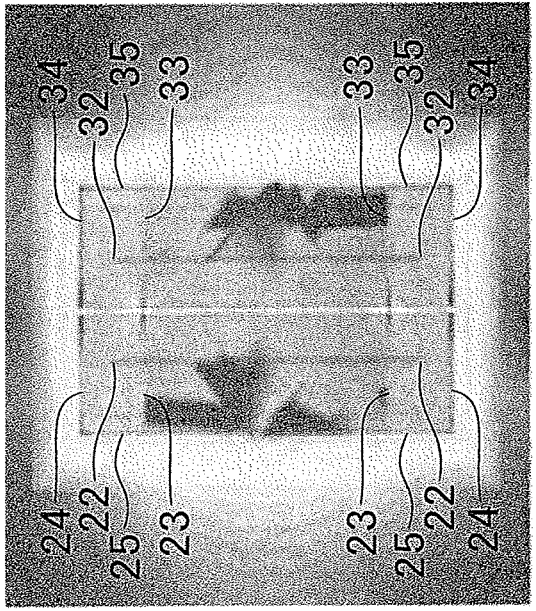
FIG.13(B) ANTIPHASE RESONANCE MODE FH

SECOND COMPARATIVE EXAMPLE

SECOND EXAMPLE

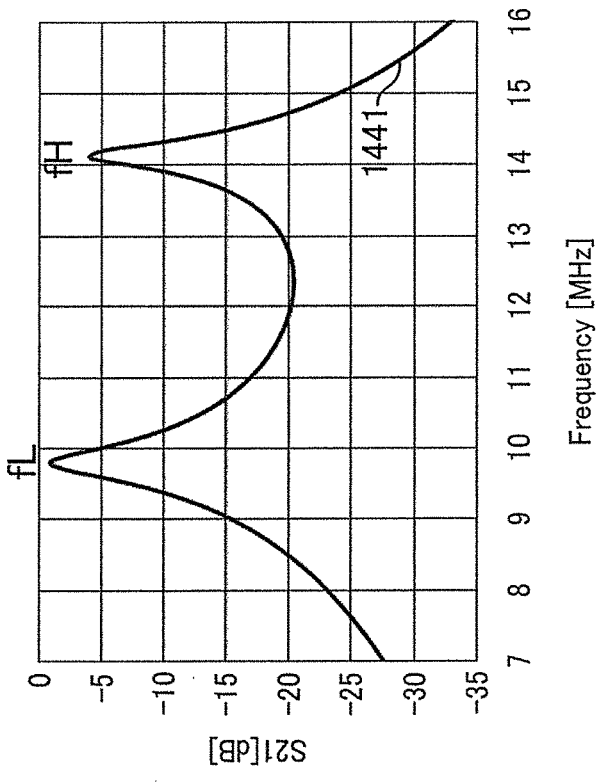
FIG.21(A) THIRD COMPARATIVE EXAMPLE
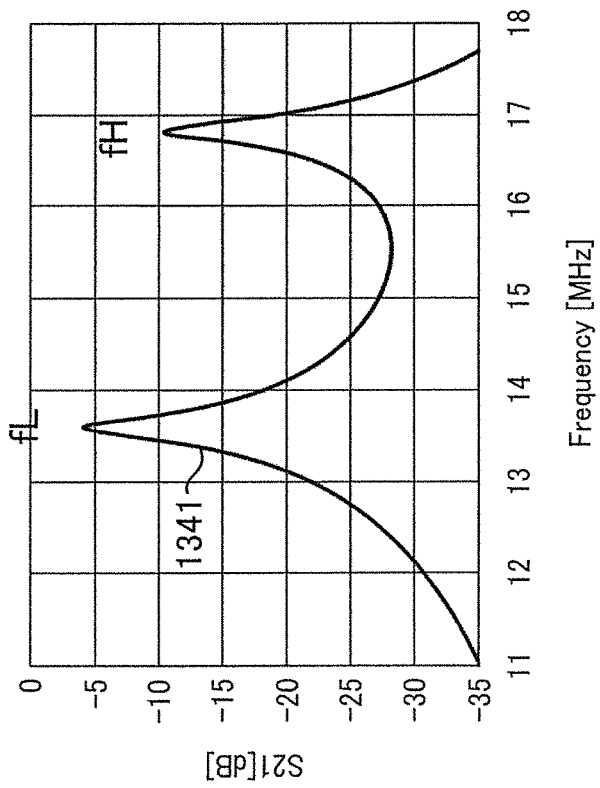
FIG.21(B) THIRD EXAMPLE FIG.23
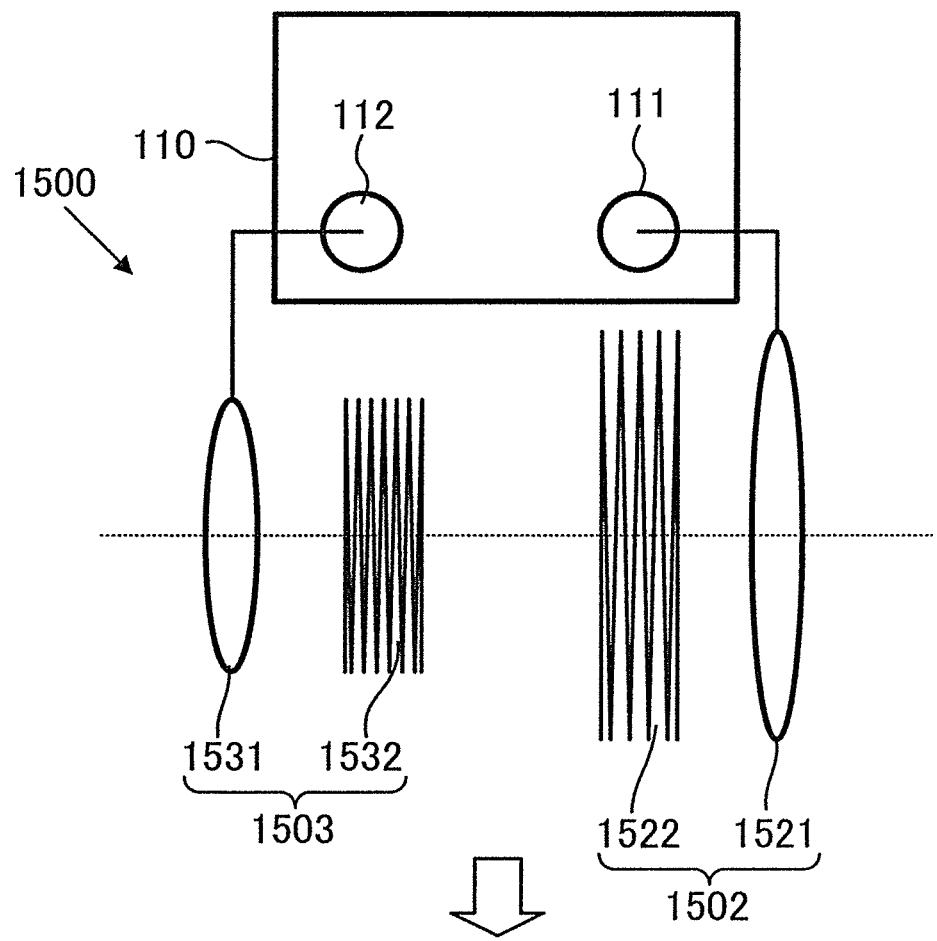
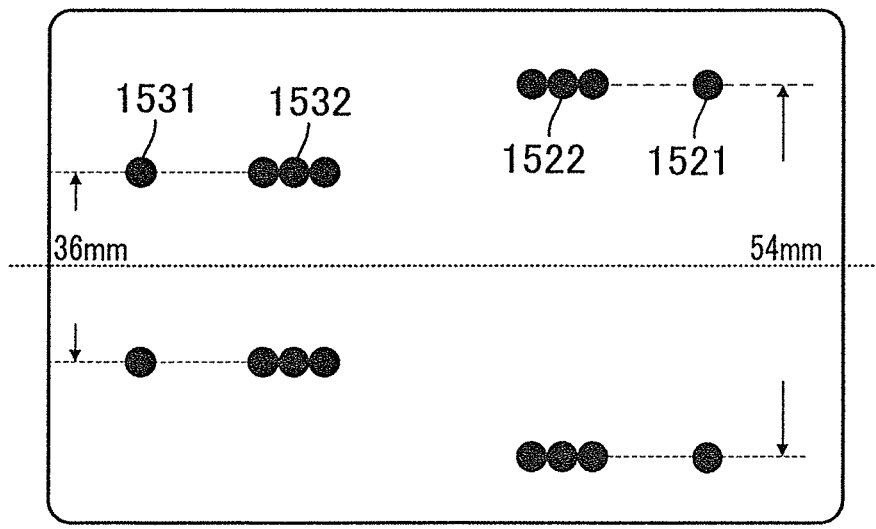

FIFTH COMPARATIVE EXAMPLE

FIFTH EXAMPLE

WIRELESS POWER TRANSMISSION APPARATUS

TECHNICAL FIELD

The present invention relates to a wireless power transmission apparatus configured to conduct contactless power transmission.

BACKGROUND ART

Electronic devices such as laptop PCs, tablet PCs, digital cameras, and mobile phones, which are portable while being used by the user are rapidly increasing in recent years. Many of these electronic devices have therein a rechargeable battery, which requires periodical charging. To facilitate the work for charging the rechargeable battery of an electronic device, there are an increasing number of devices for charging rechargeable batteries by using a power-supplying technology (wireless power transmission technology performing power transmission by varying the magnetic field) that performs wireless power transmission between a power-supplying device and a power-receiving device mounted in an electronic device.

Examples of such a wireless power transmission technology includes: a technology that performs power transmission by means of electromagnetic induction between coils (e.g. see PTL 1) and a technology that performs power transmission by means of resonance phenomena between resonators (coils) provided to the power-supplying device and the power-receiving device (e.g. see PTL 2).

These wireless power transmission technologies, during wireless power transmission, cause a considerable transmission loss as compared with wired power transmission. Reduction of this transmission loss in order to improve the power transmission efficiency (ratio of the power received by the power-receiving device for the power transmitted from the power-supplying device) has been a major issue.

To address this issue, for example, PTL 2 discloses a wireless power transmission apparatus, which even when the distance between the power-supplying resonance coil and the power-receiving resonance coil changes, maintains the resonant state to achieve a high power transmission efficiencies from the power-supplying device to the power-receiving device, by changing the resonance frequencies of power-supplying resonance coil and the power-receiving resonance coil to successively change the coupling strength between the power-supplying resonance coil and the power-receiving resonance coil. Further, PTL 3 discloses a wireless power device capable of improving the power transmission efficiency of the entire device by changing the coupling strength between a power-supplying coil and a power-receiving coil. Further, PTL 4 discloses a power supply system provided with a power-supplying resonance coil and a power-receiving resonance coil between a power-supplying coil and a power-receiving coil, which system detects the distance c between the power-supplying resonance coil and the power-receiving resonance coil when performing contactless power supply and adjusts the distance a between the power-supplying coil and the power-supplying resonance coil and the distance b between the power-receiving coil and the power-receiving resonance coil so as to maximize the power-supplying efficiency according to the distance c detected.

CITATION LIST

Patent Literature

[PTL 1] Japanese patent No. 4624768
[PTL 2] Japanese Unexamined Paten Publication No. 239769/2010
[PTL 3] Japanese Unexamined Paten Publication No. 239777/2010
[PTL 4] Japanese Unexamined Paten Publication No. 124522/2010

SUMMARY OF INVENTION

Technical Problem

The technologies in the above mentioned disclosures indeed improve the power transmission efficiency. However, the disclosed technologies necessitates control devices for changing the resonance frequency, changing the coupling strength between two resonators, adjusting the distance between a power-supplying coil and a power-supplying resonance coil, and adjusting the distance between a power-receiving coil and a power-receiving resonance coil, which consequently leads to a complex structure and increased costs.

It is therefore an object of the present invention to provide a wireless power transmission apparatus which achieves an improved power transmission efficiency with a simple structure, without a need of traditionally-needed control devices for changing the resonance frequency, changing the coupling strength between two resonators, adjusting the distance between a power-supplying coil and a power-supplying resonance coil, and adjusting the distance between a power-receiving coil and a power-receiving resonance coil.

Technical Solution

An aspect of the present invention to achieve the above object is a wireless power transmission apparatus configured to perform power transmission by varying a magnetic field between a power-supplying module and a power-receiving module, wherein the power-supplying module and the power-receiving module comprise: coils; and a magnetic member which covers at least partially one or more surfaces of the coils of the power-supplying module or one of the coils of the power-receiving module, except for a surface facing a surface of another one of the coils.

In the above structure, the magnetic member covers at least partially one or more surfaces of the coils of the power-supplying module or one of the coils of the power-receiving module, except for the surface facing a surface of the other one of the coils. This, when performing power transmission by varying the magnetic field between the power-supplying module and the power-receiving module, improves the power transmission efficiency of the power transmitted from the power-supplying module to the power-receiving module, as compared with a case of having no magnetic member.

Another aspect of the present invention to achieve the above object is the wireless power transmission apparatus adapted so that the magnetic member is arranged so as to cover an inner circumferential surface of the one of the coils of the power-supplying module and/or the one of the coils of the power-receiving module.

In the above structure, the magnetic member is arranged so as to cover the inner circumferential surface of the one of the coils facing the one of the coils of the power-supplying module or the one of the coils of the power-receiving module. This, when performing power transmission by varying the magnetic field between the power-supplying module and the power-receiving module, improves the power transmission efficiency of the power transmitted from the power-supplying module to the power-receiving module, as compared with a case where no magnetic member is arranged on the inner circumferential surface side of the one of the coils of the power-supplying module or the one of the coils of the power-receiving module.

Another aspect of the present invention to achieve the above object is the wireless power transmission apparatus adapted so that the magnetic member is arranged so as to cover an outer circumferential surface of the one of the coils of the power-supplying module and/or the one of the coils of the power-receiving module.

In the above structure, the magnetic member is arranged so as to cover the outer circumferential surface of the one of the coils facing the one of the coils of the power-supplying module or the one of the coils of the power-receiving module. This, when performing power transmission by varying the magnetic field between the power-supplying module and the power-receiving module, improves the power transmission efficiency of the power transmitted from the power-supplying module to the power-receiving module, as compared with a case where no magnetic member is arranged on the outer circumferential surface side of the one of the coils of the power-supplying module or the one of the coils of the power-receiving module.

Another aspect of the present invention to achieve the above object is the wireless power transmission apparatus adapted so that the magnetic member is arranged on a surface of the one of the coils, which surface is opposite to the surface facing the other one of the coils in the power-supplying module or the power-receiving module.

In the above structure, the magnetic member is arranged on the surface of the one of the coils, which surface is opposite to the surface facing the other one of the coils in the power-supplying module or the power-receiving module. This, when performing power transmission by varying the magnetic field between the power-supplying module and the power-receiving module, improves the power transmission efficiency of the power transmitted from the power-supplying module to the power-receiving module, as compared with a case where no magnetic member is arranged on the surface of the one of the coils opposite to the surface facing the one of the coils of the power-supplying module or the one of the coils of the power-receiving module.

Another aspect of the present invention to achieve the above object is the wireless power transmission apparatus adapted so that power transmission is performed from the coils of the power-supplying module to the coils of the power-receiving module, by causing resonance between these coils.

The above structure improves the power transmission efficiency of the power transmitted from the power-supplying module to the power-receiving module, when power transmission using resonance between the coils of the power-supplying module and the power-receiving module is performed.

Another aspect of the present invention to achieve the above object is the wireless power transmission apparatus adapted so that the coils in the power-supplying module are a power-supplying coil and a power-supplying resonator; the coils of the power-receiving module are a power-receiving coil and a power-receiving resonator; and power fed to the power-supplying coil is fed to the power-supplying resonator by means of electromagnetic induction, the power fed to the power-supplying resonator is transmitted as a magnetic field energy from the power-supplying resonator to the power-receiving resonator by having the power-supplying resonator resonating with the power-receiving resonator, and the power transmitted to the power-receiving resonator is fed to the power-receiving coil by means of electromagnetic induction, thereby performing power transmission.

The above structure improves the power transmission efficiency of the power transmitted from the power-supplying module to the power-receiving module, when power transmission using magnetic resonance between the power-supplying coil and the power-supplying resonator and the power-receiving coil and the power-receiving resonator is performed.

Advantageous Effects

There is provided a wireless power transmission apparatus which achieves an improved power transmission efficiency with a simple structure, without a need of traditionally-needed control devices for changing the resonance frequency, changing the coupling strength between two resonators, adjusting the distance between a power-supplying coil and a power-supplying resonance coil, and adjusting the distance between a power-receiving coil and a power-receiving resonance coil.

BRIEF DESCRIPTION OF DRAWINGS

FIGS. 4(A) and 4(B) are diagrams showing distribution of the magnetic field strength related to the comparative example.

FIGS. 7(A) and 7(B) are diagrams showing distribution of the magnetic field strength related to the example 1.

FIGS. 10(A) and 10(B) are diagrams showing distribution of the magnetic field strength related to example 2.

FIGS. 13(A) and 13(B) are diagrams showing distribution of the magnetic field strength related to the example 3.

FIGS. 21(A) and 21(B) are graphs indicating measurement results of the transmission characteristics S21 related to the third comparative example and the third example.

FIG. 23 is a diagram showing a structure of a wireless power transmission apparatus related to a fourth comparative example.

DESCRIPTION OF EMBODIMENTS

The following describes examples and embodiments of a wireless power transmission apparatus related to the present invention.
(Overview)

Figure 1:
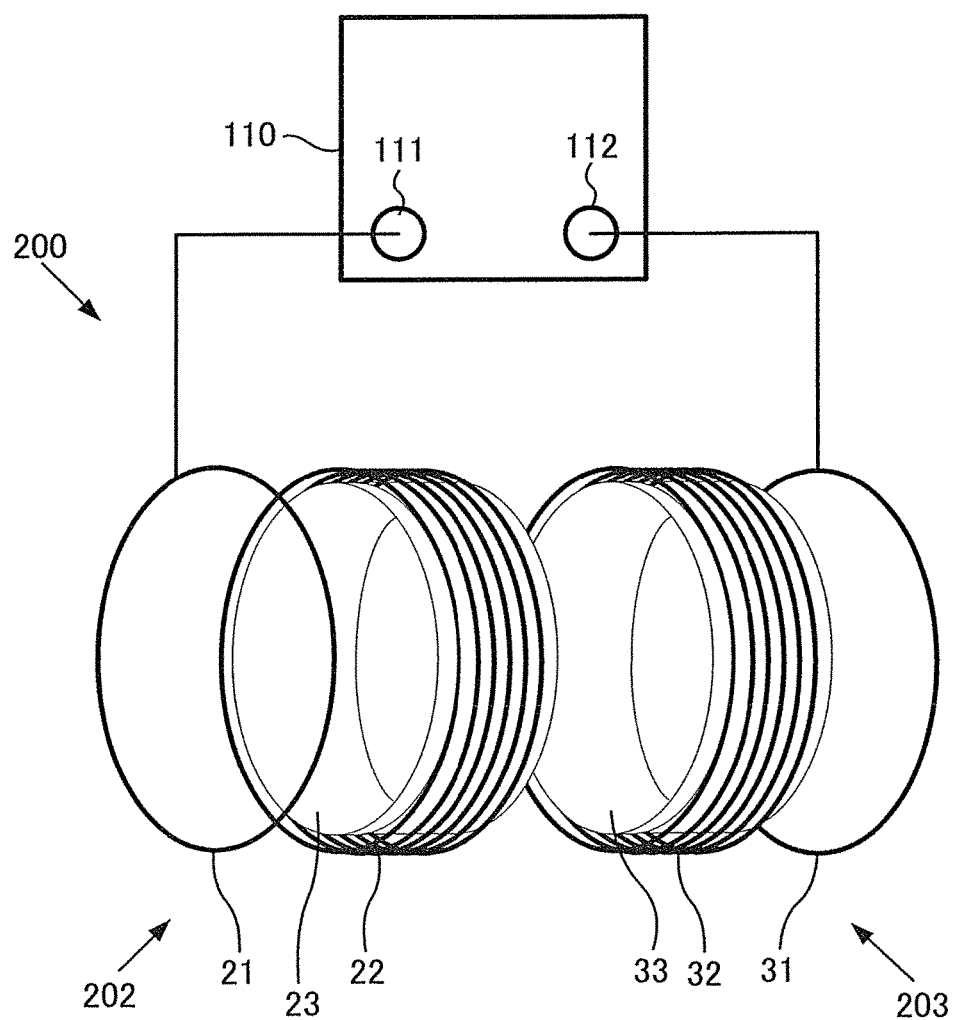
FIG. 1 is a schematic explanatory diagram of a wireless power transmission apparatus related to the present invention.

As shown in FIG. 1, a wireless power transmission apparatus 200 related to the present invention includes: a power-supplying module 202 having a power-supplying coil 21 and a power-supplying resonator 22 (coil); a power-receiving module 203 having a power-receiving coil 31 and a power-receiving resonator 32 (coil). The power-supplying resonator 22 and the power-receiving resonator 32 are arranged so that their coil surfaces face each other. Further, the power-supplying module 202 and the power-receiving module 203 have magnetic members 23 and 33 which at least partially cover the power-supplying resonator 22 and the power-receiving resonator 32 except for their surfaces facing each other. Specifically, the magnetic member 23 has a cylindrical shape and is arranged on the inner circumferential surface side of the coil of the power-supplying resonator 22 so as to cover the entire inner circumferential surface of the coil. Similarly, the magnetic member 33 has a cylindrical shape and is arranged on the inner circumferential surface side of the coil of the power-receiving resonator 32 so as to cover the entire inner circumferential surface of the coil. Further, the power-supplying coil 21 of the power-supplying module 202 and a later-described output terminal 111 of a network analyzer 110 are connected by wiring and are therefore capable of outputting AC power of any frequency from the output terminal 111 to the power-supplying coil 21. The power-receiving coil 31 of the power-receiving module 203 and an input terminal 112 of the network analyzer 110 are connected by wiring so as to enable measurement of the power input to from the power-receiving coil 31 to the input terminal 112. Power transmission is conducted from the power-supplying resonator 22 of the power-supplying module 202 to the power-receiving resonator 32 of the power-receiving module 203 by means of resonance therebetween while varying the magnetic field. Magnetic fields generated around the power-supplying resonator 22 and the power-receiving resonator 32 are shielded by the magnetic members 23 and 33. This improves the power transmission efficiency of the power transmitted from the power-supplying module 202 to the power-receiving module 203, as compared with cases without the magnetic members 23 and 33.

The power-supplying resonator 22 of the power-supplying module 202 and the power-receiving resonator 32 of the power-receiving module 203 are each a coil formed by a winding a conductive wire. Examples of such a coil includes a spiral coil manufactured by conducting etching or the like to a copper film formed on a polyimide substrate; a solenoid coil formed by winding the conductive wire in a shape of solenoid, and a loop coil. Further, the "resonance" is a phenomenon in which two or more coils are tuned to a resonance frequency. Arrangement of the coils to face each other means arranging the coils so that their coil surfaces do not perpendicularly cross each other, where each of the coil surfaces is a cross section of the coil taken along its radial direction. Further, the power transmission efficiency is a ratio of the power received by the power-receiving module 203 for the power transmitted by the power-supplying module 202.

FIRST EXAMPLE

Next, the following describes measurements of the magnetic field strength, the transmission characteristic "S21", and the power transmission efficiency conducted for wireless power transmission apparatuses 200, 300, and 400 (examples 1-3) and a wireless power transmission apparatus 100 (comparative example). In each of the wireless power transmission apparatuses 200, 300, and 400, the power-supplying resonator 22 of the power-supplying module and the power-receiving resonator 32 of the power-receiving module were arranged to face each other, and the power-supplying resonator 22 and the power-receiving resonator 32 were each covered at least partially by a magnetic member except for the surface facing the surface of the counterpart. On the other hand, no magnetic member was arranged in the wireless power transmission apparatus 100.

(Structure of Wireless Power Transmission Apparatus 100 Related to Comparative Example)

Figure 2:
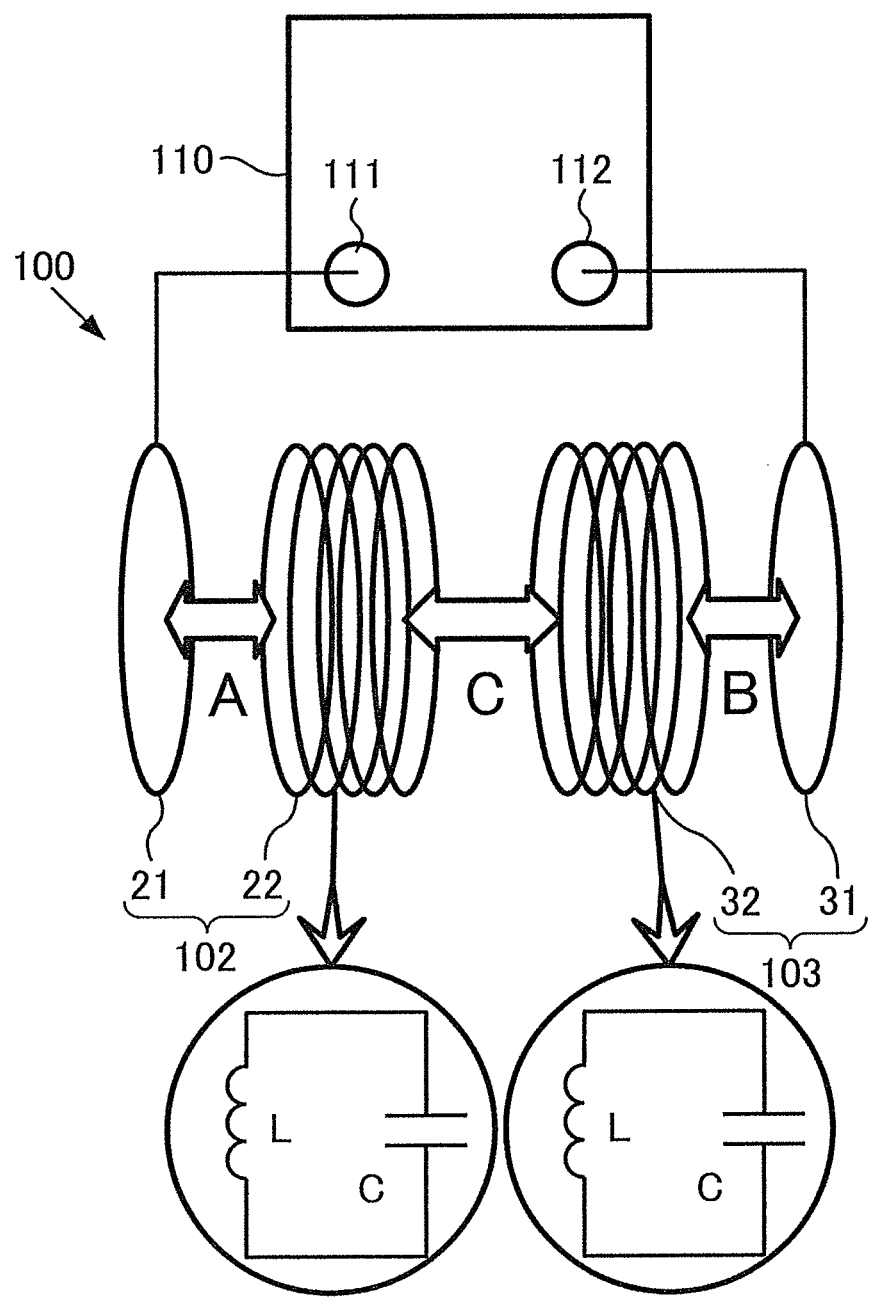
FIG. 2 is a diagram showing a structure of a wireless power transmission apparatus related to a comparative example.

As shown in FIG. 2, the wireless power transmission apparatus 100 used in the comparative example included: a power-supplying module 102 having a power-supplying coil 21 and a power-supplying resonator 22; and a power-receiving module 103 having a power-receiving coil 31 and a power-receiving resonator 32. To the power-supplying coil 21 was connected an output terminal 111 of a network analyzer 110 (produced by Agilent Technologies, Inc.). To the power-receiving coil 31 was connected an input terminal 112 of the network analyzer 110. When power is supplied to the power-supplying module 102 in the wireless power transmission apparatus 100 with the above-described structure, the power is supplied as magnetic field energy from the power-supplying resonator 22 to the power-receiving resonator 32 by means of resonance.

The network analyzer 110 is capable of outputting from its output terminal 111 AC power of any given frequency to the power-supplying coil 21. The network analyzer 110 is also capable of measuring the power input from the power-receiving coil 31 to the input terminal 112. Further, the network analyzer 110 is also capable of measuring the transmission characteristic "S21" shown in FIG. 3 and the power transmission efficiency shown in FIG. 14.

The power-supplying coil 21 plays a role of supplying the power obtained from the network analyzer 110 to the power-supplying resonator 22 by means of electromagnetic induction. The power-supplying coil 21 was formed by winding once a copper wire material (coated by insulation film) having a wire diameter of 1 mmφ, and its coil diameter was set to 100 mmφ.

The power-receiving coil 31 plays a role of outputting, to the input terminal 112 of the network analyzer 110, the power having been transmitted as a magnetic field energy from the power-supplying resonator 22 to the power-receiving resonator 32, by means of electromagnetic induction. This power-receiving coil 31, as in the case of the power-supplying coil 21, was formed by winding once a copper wire material (coated by insulation film) having a wire diameter of 1 mmφ, and its coil diameter was set to 100 mmφ.

The power-supplying resonator 22 and the power-receiving resonator 32 are each an LC resonance circuit and play a role of creating a magnetic field resonant state. In this example, the capacitor component of the LC resonance circuit was realized in the form of an element. However, the capacitor component may be a stray capacitance realized by making the both ends of the coil open. In this LC resonance circuit, the resonance frequency is f which is derived from (formula 1) below. where the inductance is L, and the capacity of capacitor is C.

$$f = 1/(2\pi\sqrt{(LC)}) \quad \text{(formula 1)}$$

The power-supplying resonator 22 and the power-receiving resonator 32 were each a solenoid coil formed by winding three times a copper wire material (coated by insulation film) having a wire diameter of 1 mmφ in the form of solenoid, with its coil diameter being 100 mmφ. The resonance frequency of the power-supplying resonator 22 and the power-receiving resonator 32 was set to 13.0 MHz. The power-supplying resonator 22 and the power-receiving resonator 32 were arranged so that the coil surfaces of the power-supplying resonator 22 and the power-receiving resonator 32 were parallel and faced each other.

When a magnetic field resonant state is created between the power-supplying resonator 22 and the power-receiving resonator 32 by having these resonators resonating with each other at the resonance frequency, power is transmitted from the power-supplying resonator 22 to the power-receiving resonator 32 as magnetic field energy (power transmission by means of resonance between coils).

The distance A between the power-supplying coil 21 and the power-supplying resonator 22 was set to 15 mm, the distance B between the power-receiving coil 31 and the power-receiving resonator 32 was set to 15 mm, and the distance C between the power-supplying resonator 22 and the power-receiving resonator 32 was set to 30 mm (see FIG. 2).

(Measurement Results of Comparative Example)

The following describes the magnetic field strength, the transmission characteristic "S21", and the power transmission efficiency resulted from the measurement conducted on the wireless power transmission apparatus 100 related to the comparative example. Note that, an electromagnetic field analysis was conducted to measure the magnetic field strength, and the magnetic field strengths are expressed in different color tones.

First, using the network analyzer 110, the transmission characteristic "S21" of the wireless power transmission apparatus 100 related to the comparative example was measured at various frequencies of the AC power to the wireless power transmission apparatus 100. As shown in the graph of FIG. 3, the horizontal axis indicates the frequency of the AC power output from the output terminal 111, and the vertical axis indicates the transmission characteristic "S21".

The transmission characteristic "S21" is indicated in units of decibel and indicates signals out of those from the output terminal 111 having passed the input terminal 112. Therefore, the higher the value, the higher the power transmission efficiency is. Further, as already mentioned, the power transmission efficiency means a ratio of the power received by the power-receiving module 203 of the power transmitted from the power-supplying module 202. In this case, it means a ratio of the power output to the input terminal 112 for the power supplied from the output terminal 111 to the power-supplying module, while the wireless power transmission apparatus 101 is connected to the network analyzer 110.

Figure 3:
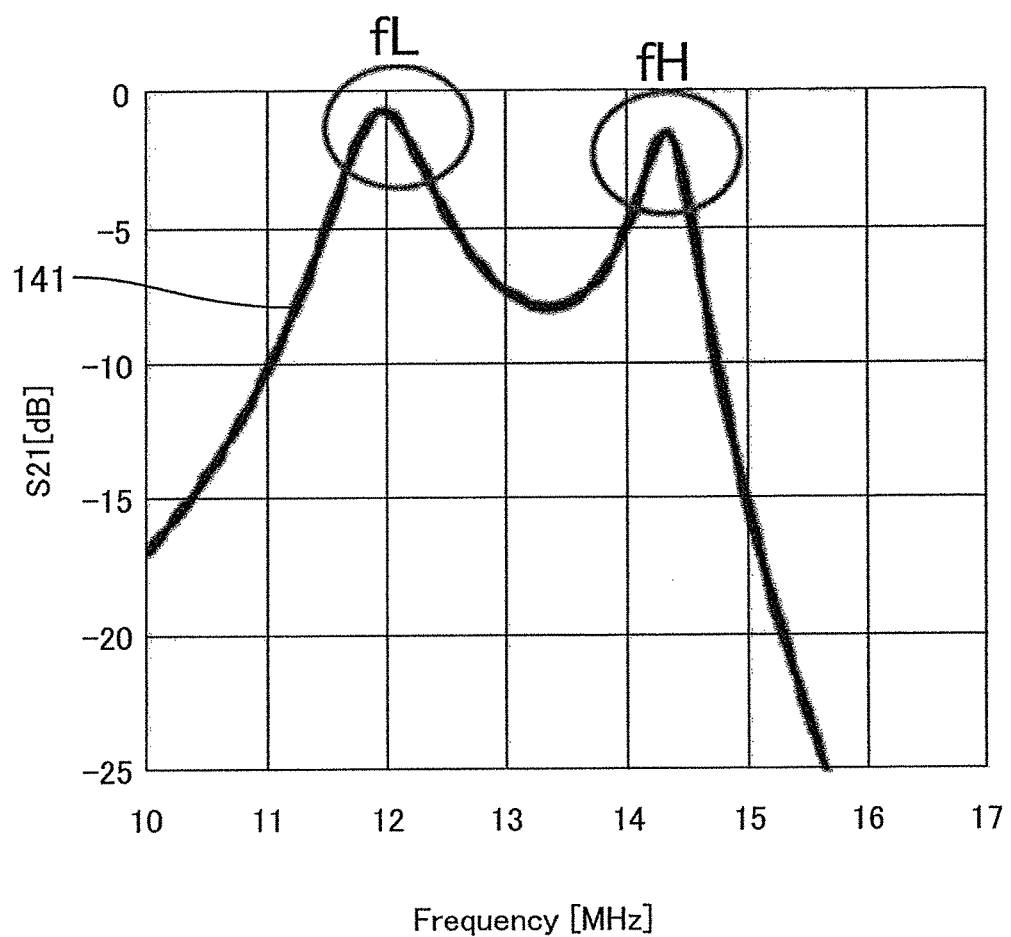
FIG. 3 is a graph indicating measurement results of a transmission characteristic S21 related to the comparative example.

The measurement of the transmission characteristic "S21" resulted in a waveform 141 having separate peaks; one on a low frequency side and another on a high frequency side, as shown in FIG. 3. Of the separate peaks, the frequency on the high frequency side is indicated as fH, and the frequency on the low frequency side is indicated as fL.

When the frequency of the AC power to the power-supplying module 102 was set to the frequency fL nearby the peak on the low frequency side, the power-supplying resonator 22 and the power-receiving resonator 32 were resonant with each other in inphase, and the current in the power-supplying resonator 22 and the current in the power-receiving resonator 32 both flow in the same direction. The distribution of the magnetic field strength in this inphase resonance mode is shown in FIG. 4 (A). From the distribution of the magnetic field strengths in FIG. 4 (A), it is understood that magnetic field expands about the power-supplying resonator 22 and the power-receiving resonator 32. Note that the resonance state in which the current in the coil (power-supplying resonator 22) of the power-supplying module and the current in the coil (power-receiving resonator 32) of the power-receiving module both flow in the same direction is referred to as inphase resonance mode.

On the other hand, when the frequency of the AC power to the power-supplying module 102 was set to the frequency fH nearby the peak on the side of the high frequency side, the power-supplying resonator 22 and the power-receiving resonator 32 resonated with each other in antiphase, and the current in the power-supplying resonator 22 and the current in the power-receiving resonator 32 flow opposite directions to each other. The distribution of magnetic field strengths in this antiphase resonance mode is shown in FIG. 4 (B). From the distribution of the magnetic field strengths shown in FIG. 4 (B), it should be understood that the magnetic field expanded about the power-supplying resonator 22 and the power-receiving resonator 32. Further, it should be confirmed that, between the power-supplying resonator 22 and the power-receiving resonator 32, there is a space in which the strength of the magnetic field is low. The resonance state in which the current in the coil (power-supplying resonator 22) of the power-supplying module and the current in the coil (power-receiving resonator 32) of the power-receiving module flow opposite directions to each other is referred to as antiphase resonance mode.

Figure 14:
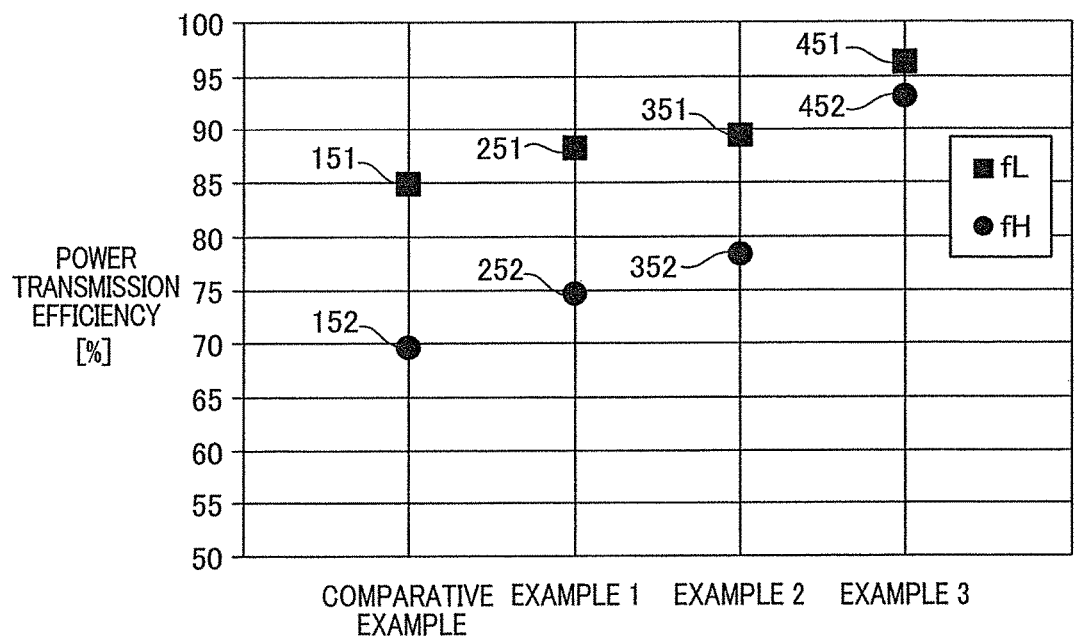
FIG. 14 is a graph indicating measurement results of the power transmission efficiency.

Next, with the use of the network analyzer 110, measurement of the power transmission efficiency was conducted for the wireless power transmission apparatus 100 related to the comparative example, both in the inphase and the antiphase resonance modes. The measurement results are shown in FIG. 14. Along the horizontal axis of the graph of FIG. 14, the results of the comparative example and the examples 1-3 are aligned. The vertical axis of the graph shows the resulting power transmission efficiency [%].

As should be understood from FIG. 14, in the comparative example, the power transmission efficiency in the inphase resonance mode (fL) was 85% (see ■151 of FIG. 14). Further, the power transmission efficiency in the antiphase resonance mode (fH) was 69% (see ●152 in FIG. 14).

(Structure of Wireless Power Transmission Apparatus 200 Related to Example 1)

Figure 5:
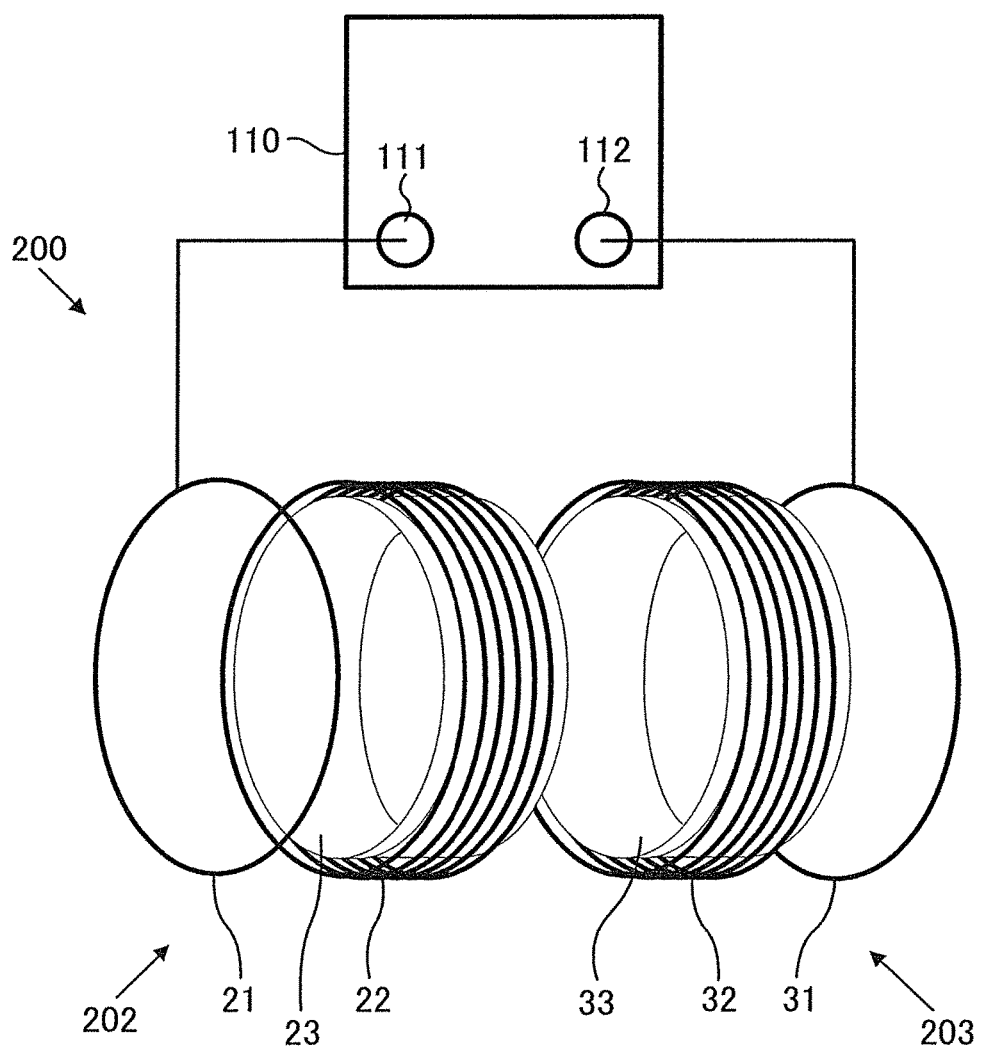
FIG. 5 is a diagram showing a structure of a wireless power transmission apparatus related to an example 1.

Next, as shown in FIG. 5, the wireless power transmission apparatus 200 used in example 1 included: a power-supplying module 202 having a power-supplying coil 21, a power-supplying resonator 22, and a cylindrical magnetic member 23 covering the entire inner circumferential surface of the coil of the power-supplying resonator 22; and a power-receiving module 203 including a power-receiving coil 31, a power-receiving resonator 32, and a cylindrical magnetic member 33 covering the entire inner circumferential surface of the coil of the power-receiving resonator 32. As in the comparative example, the power-supplying coil 21 was connected to the output terminal 111 of the network analyzer 110 and the power-receiving coil 31 was connected to the input terminal 112 of the network analyzer 110.

The magnetic members 23 and 33 are made of a resin in which magnetic powder was dispersed therein. The resin used for the magnetic members 23 and 33 may be a thermosetting resin or a thermoplastic resin, and is not particularly limited. For example, examples of a thermosetting resin adoptable includes epoxy resin, phenol resin, melamine resin, vinyl ester resin, cyano ester resin, maleimide resin, silicon resin, and the like. Further, examples of a thermoplastic resin include acrylic resin, vinyl acetate based resin, poly vinyl alcohol based resin, and the like. In this example, a resin whose main constituent is epoxy resin was adopted.

As the magnetic powder dispersed in the resin, a soft magnetic powder was used. The soft magnetic powder is not particularly limited. For example, pure Fe, Fe—Si, Fe—Al—Si (sendust), Fe—Ni (permalloy), soft ferrites, Fe-base amorphous powder, Co-base amorphous powder, Fe—Co (permendur), and the like are adoptable.

The magnetic members 23 and 33 had a cylindrical shape with a thickness of 1 mm, an outer diameter of 80 mmϕ, and an inner diameter of 78 mm. Its magnetic permeability was 100. The structures, other than those described above, were similar to that of the wireless power transmission apparatus 100 related to the comparative example.

(Measurement Result of Example 1)

Next, the following describes the magnetic field strength, the transmission characteristic "S21", and the power transmission efficiency resulted from the measurement performed on the wireless power transmission apparatus 200 related to the example 1.

First, using the network analyzer 110, the transmission characteristic "S21" of the wireless power transmission apparatus 200 related to the example 1 was measured with various frequencies of the AC power supplied to the wireless power transmission apparatus 200.

Figure 6:
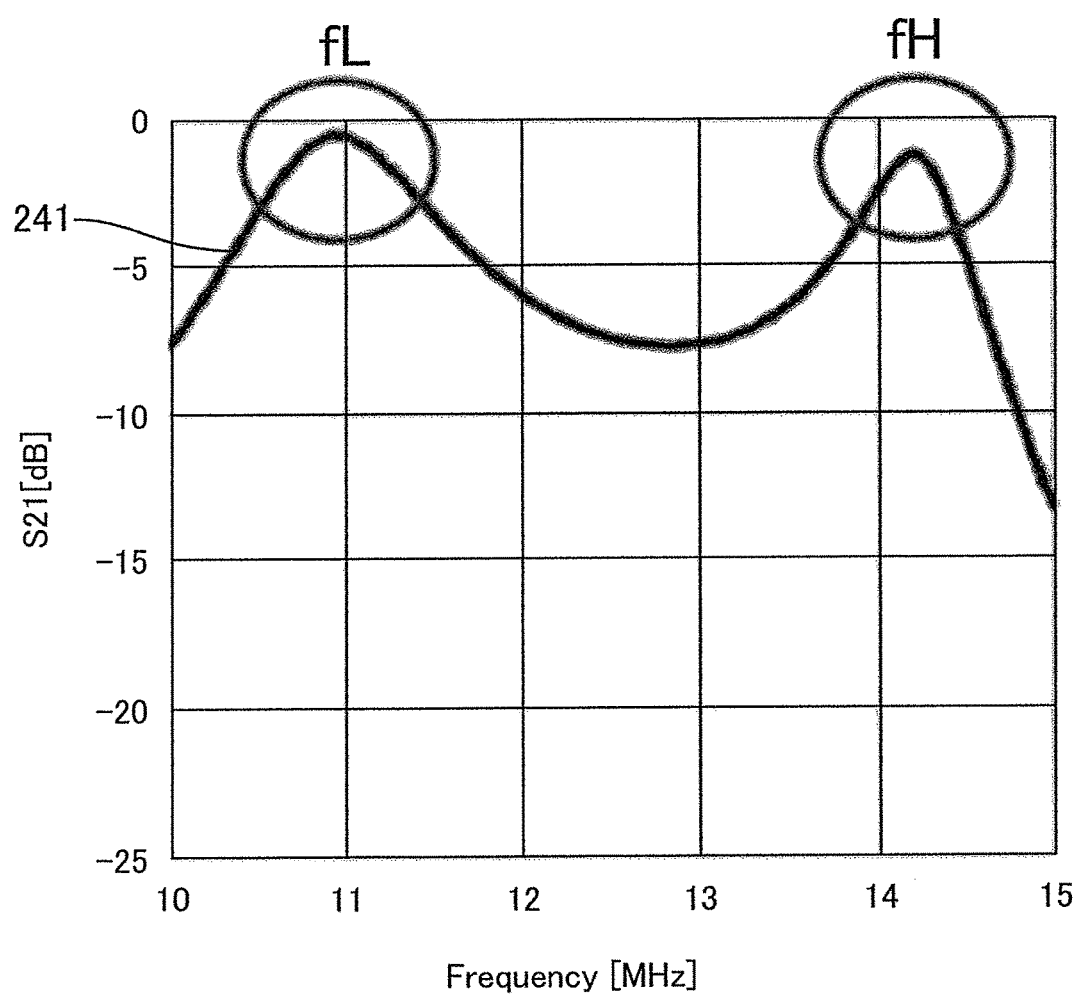
FIG. 6 is a graph indicating measurement results of a transmission characteristic S21 related to the example 1.

The measurement of the transmission characteristic "S21" resulted in a waveform 241 having separate peaks; one on a low frequency side and another on a high frequency side, as shown in FIG. 6. Of the separate peaks, the frequency on the high frequency side is indicated as fH, and the frequency on the low frequency side is indicated as fL.

When the frequency of the AC power to the power-supplying module 202 was set to the frequency fL nearby the peak on the low frequency side (inphase resonance mode), the power-supplying resonator 22 and the power-receiving resonator 32 were resonant with each other in inphase, and the current in the power-supplying resonator 22 and the current in the power-receiving resonator 32 both flowed in the same direction. The distribution of the magnetic field strength in this inphase resonance mode is shown in FIG. 7 (A). From this distribution of magnetic field strength shown in FIG. 7 (A), it is confirmed that the magnetic field on the inner circumference side of the power-supplying resonator 22 and the power-receiving resonator 32 is slightly weakened, compared to that in the case of the comparative example (see FIG. 4 (A)).

On the other hand, when the frequency of the AC power to the power-supplying module 202 was set to the frequency fH nearby the peak on the side of the high frequency side (antiphase resonance mode), the power-supplying resonator 22 and the power-receiving resonator 32 resonated with each other in antiphase, and the current in the power-supplying resonator 22 and the current in the power-receiving resonator 32 flowed opposite directions to each other. The distribution of magnetic field strengths in this antiphase resonance mode is shown in FIG. 7 (B). From this distribution of magnetic field strength shown in FIG. 7 (B), it is confirmed that the magnetic field on the inner circumference side of the power-supplying resonator 22 and the power-receiving resonator 32 is significantly weakened, compared to that in the case of the comparative example (see FIG. 4 (B)).

Next, with the use of the network analyzer 110, measurement of the power transmission efficiency was conducted for the wireless power transmission apparatus 200 related to the example 1, both in the inphase and the antiphase resonance modes. The measurement results are shown in FIG. 14.

As shown in FIG. 14, the power transmission efficiency of the example 1 in the inphase resonance mode (fL) was 88% (see FIG. 14: ■251). Further, the power transmission efficiency in the antiphase resonance mode (fH) was 75% (see FIG. 14: ●252). As should be understood from this, the wireless power transmission apparatus 200 in the example 1 resulted in a better power transmission efficiency than that of the wireless power transmission apparatus 100 in the comparative example 1. In other words, the provision of the magnetic members 23 and 33 as in the wireless power transmission apparatus 200 improves the power transmission efficiency as compared with the wireless power transmission apparatus 100 in which the magnetic members 23 and 33 are not arranged on the inner circumferential surface sides of the power-supplying resonator 22 and the power-receiving resonator 32.

(Structure of Wireless Power Transmission Apparatus 300 Related to Example 2)

Figure 8:
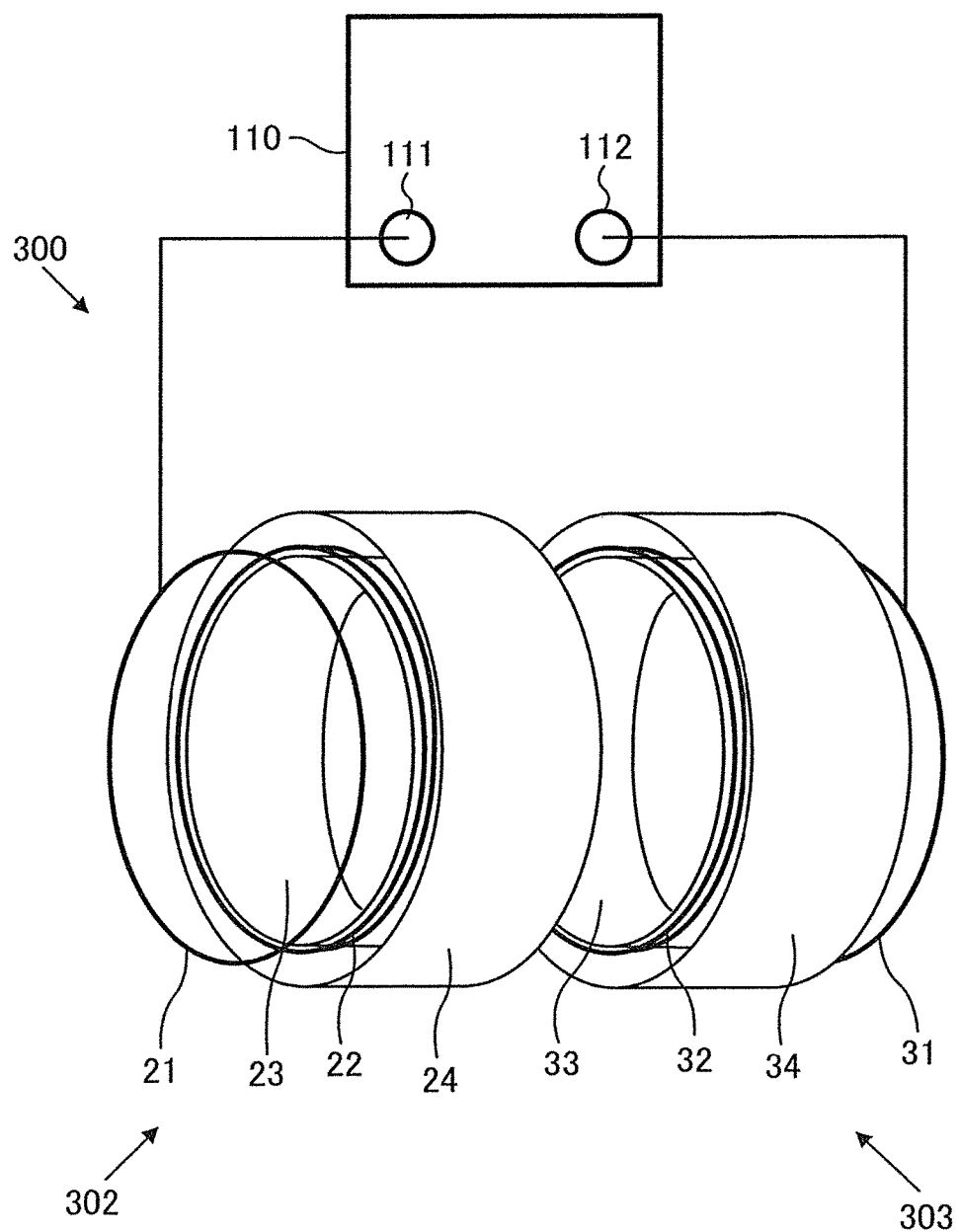
FIG. 8 is a diagram showing a structure of a wireless power transmission apparatus related to an example 2.

Next, as shown in FIG. 8, the wireless power transmission apparatus 300 used in the example 2 included a power-supplying module 302 and a power-receiving module 303. The power-supplying module 302 included: a power-supplying coil 21, a power-supplying resonator 22, a cylindrical magnetic member 23 covering the entire inner circumferential surface of the coil of the power-supplying resonator 22, and a cylindrical magnetic member 24 covering the entire outer circumferential surface of the coil of the power-supplying resonator 22. The power-receiving module 303 included: a power-receiving coil 31, a power-receiving resonator 32, a cylindrical magnetic member 33 covering the entire inner circumferential surface of the coil of the power-receiving resonator 32, and a cylindrical magnetic member 34 covering the entire outer circumferential surface of the coil of the power-receiving resonator 32. As in the example 1, the power-supplying coil 21 was connected to the output terminal 111 of the network analyzer 110, and the power-receiving coil 31 was connected to the input terminal 112 of the network analyzer 110.

The magnetic members 24 and 34 were made of a resin in which the magnetic powder was dispersed as in the case of the magnetic members 23 and 33 of the example 1. The magnetic members 24 and 34 each had a cylindrical shape, with a thickness of 1 mm, an outer diameter of 120 mmφ, and an inner diameter of 118 mmφ.

(Measurement Result of Example 2)

Next, the following describes the magnetic field strength, the transmission characteristic "S21", and the power transmission efficiency resulted from the measurement conducted on the wireless power transmission apparatus 300 related to the example 2.

First, using the network analyzer 110, the transmission characteristic "S21" of the wireless power transmission apparatus 300 related to the example 2 was measured with various frequencies of the AC power supplied to the wireless power transmission apparatus 300.

Figure 9:
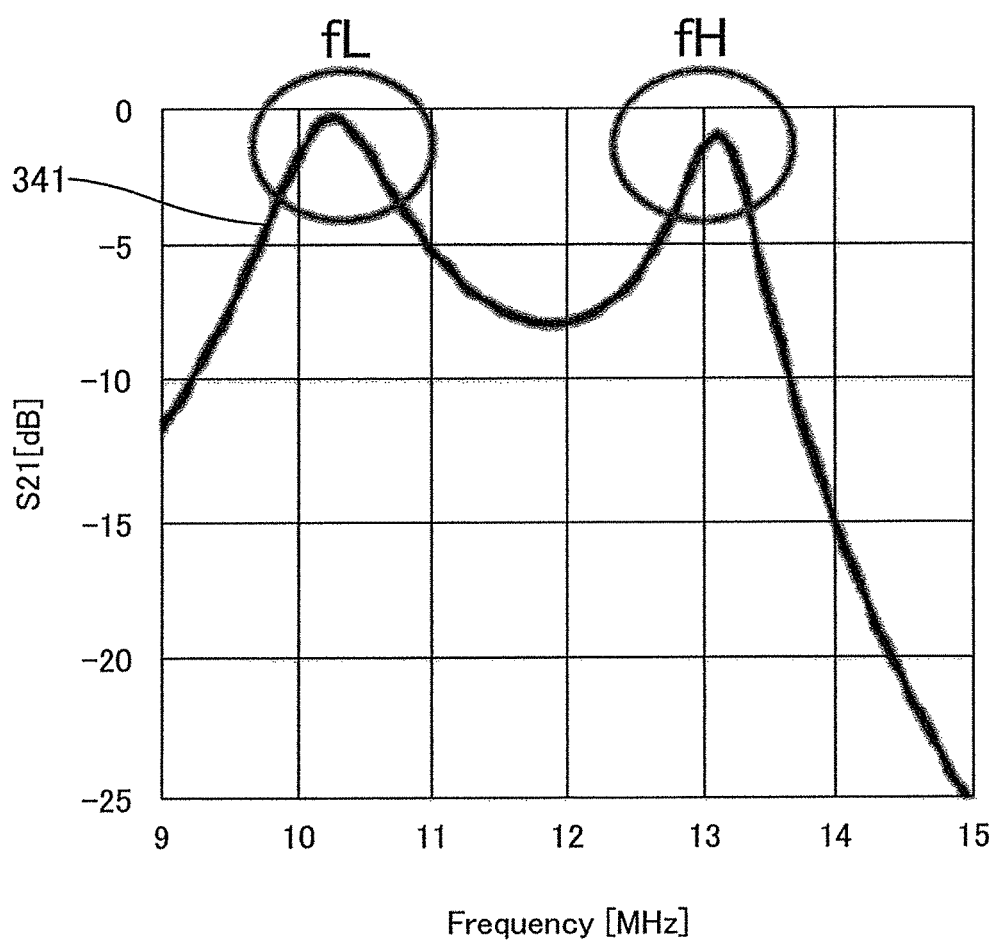
FIG. 9 is a graph indicating measurement results of a transmission characteristic S21 related to the example 2.

The measurement of the transmission characteristic "S21" resulted in a waveform 341 having separate peaks; one on a low frequency side and another on a high frequency side, as shown in FIG. 9. Of the separate peaks, the frequency on the high frequency side is indicated as fH, and the frequency on the low frequency side is indicated as fL.

The distribution of the magnetic field strength in the case of setting the frequency of the AC power to the power-supplying module 302 to the frequency fL nearby the peak on the low frequency side (inphase resonance mode) is shown in FIG. 10 (A). From this distribution of magnetic field strength shown in FIG. 10 (A), it is confirmed that the magnetic field on the inner circumference side of the power-supplying resonator 22 and the power-receiving resonator 32 is slightly weakened, compared to that in the case of the comparative example (see FIG. 4 (A)). It is further confirmed that the magnetic field leaking outside, around the power-supplying resonator 22 and the power-receiving resonator 32, is reduced as compared with the example 1 (see FIG. 7(A)).

Meanwhile, the distribution of the magnetic field strength in the case of setting the frequency of the AC power to the power-supplying module 302 to the frequency fH nearby the peak on the high frequency side (antiphase resonance mode) is shown in FIG. 10 (B). From this distribution of magnetic field strength shown in FIG. 10(B), it is confirmed that the magnetic field on the inner circumference side of the power-supplying resonator 22 and the power-receiving resonator 32 is significantly weakened, compared to that in the case of the comparative example (see FIG. 4 (B)). It is further confirmed that the magnetic field leaking outside, around the power-supplying resonator 22 and the power-receiving resonator 32, is reduced as compared with the example 1 (see FIG. 7 (B)).

Next, with the use of the network analyzer 110, measurement of the power transmission efficiency was conducted for the wireless power transmission apparatus 300 related to the example 2, both in the inphase and the antiphase resonance modes. The measurement results are shown in FIG. 14.

As shown in FIG. 14, the power transmission efficiency of the example 2 in the inphase resonance mode (fL) was 90% (see FIG. 14: ■351). Further, the power transmission efficiency in the antiphase resonance mode (fH) was 78% (see FIG. 14: ●352). As should be understood from this, the wireless power transmission apparatus 300 in the example 2 resulted in a better power transmission efficiency than those of the wireless power transmission apparatus 100 in the comparative example 1 and the wireless power transmission apparatus 200 of the example 1. In other words, the provision of the magnetic members 23 and 33 and the magnetic members 24 and 34 as in the wireless power transmission apparatus 300 improves the power transmission efficiency as compared with the wireless power transmission apparatus 200 in which only the magnetic members 23 and 33 are arranged on the inner circumferential surface sides of the power-supplying resonator 22 and the power-receiving resonator 32.

(Structure of Wireless Power Transmission Apparatus 400 Related to Example 3)

Figure 11:
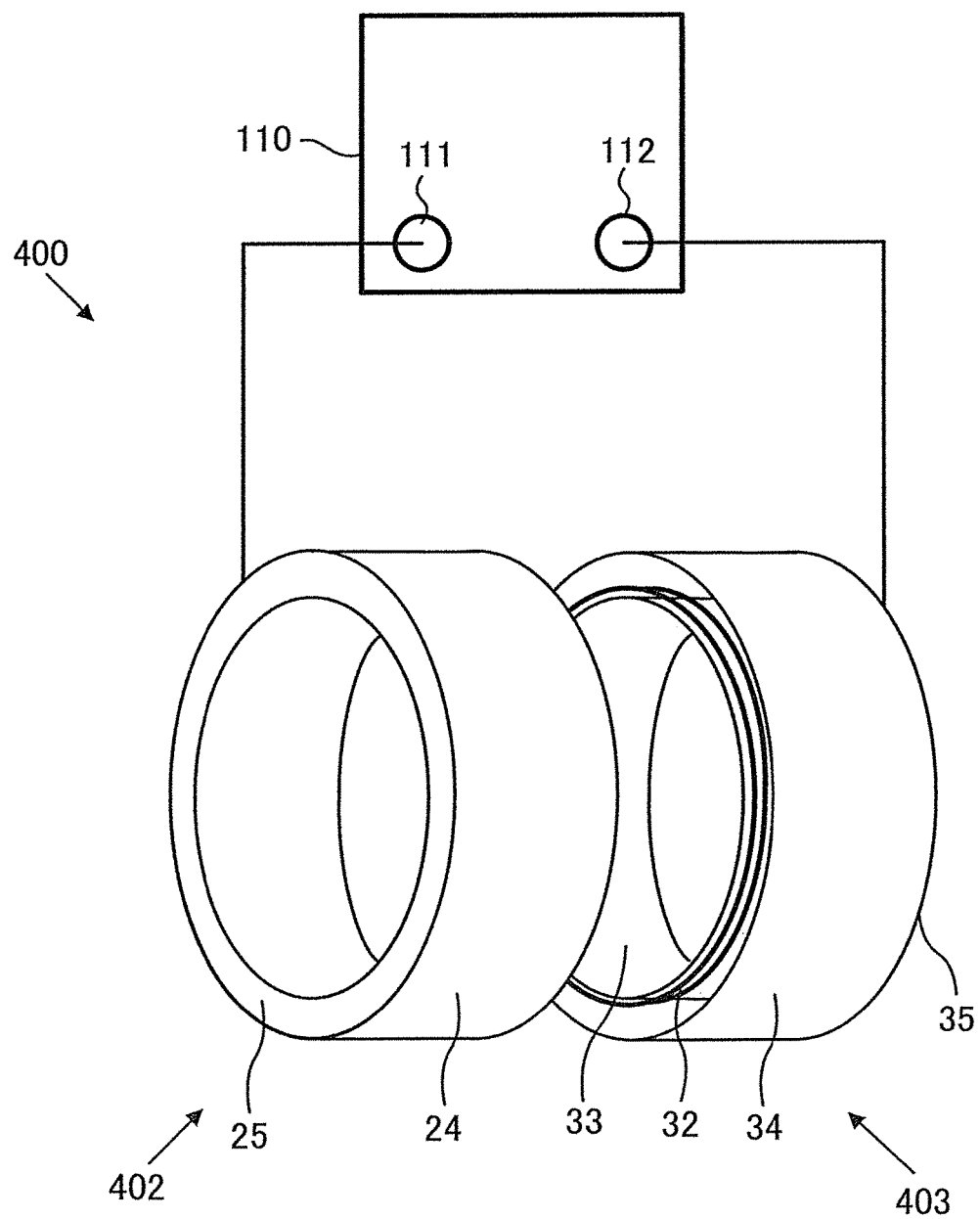
FIG. 11 is a diagram showing a structure of a wireless power transmission apparatus related to an example 3.

As shown in FIG. 11, the wireless power transmission apparatus 400 used in the example 3 included a power-supplying module 402 and a power-receiving module 403. The power-supplying module 402 included: a power-supplying coil 21, a power-supplying resonator 22, a cylindrical magnetic member 23 which covered the entire inner circumferential surfaces of the power-supplying coil 21 and the coil of the power-supplying resonator 22, a cylindrical magnetic member 24 which covers the entire outer circumferential surfaces of the power-supplying coil 21 and the coil of the power-supplying resonator 22, and a ring-shaped magnetic member 25 which covered a side surface of the coil of the power-supplying resonator 22 opposite to the side surface to face the other coil. The power-receiving module 403 included: a power-receiving coil 31, a power-receiving resonator 32, a cylindrical magnetic member 33 which covered the entire inner circumferential surfaces of the power-receiving coil 31 and the coil of the power-receiving resonator 32, a cylindrical magnetic member 34 which covered the entire outer circumferential surfaces of the power-receiving coil 31 and the coil of the power-receiving resonator 32, and a ring-shaped magnetic member 35 which covered a side surface of the coil of the power-receiving resonator 32 opposite to the surface to face the other coil. As in the example 2, the power-supplying coil 21 was connected to the output terminal 111 of the network analyzer 110, and the power-receiving coil 31 was connected to the input terminal 112 of the network analyzer 110.

The magnetic members 25 and 35 were made of a resin in which the magnetic powder was dispersed as in the case of the magnetic members 23 and 33 of the example 1. The magnetic members 25 and 35 each had a shape of an O-ring, with a thickness of 1 mm, an outer diameter of 120 mm, and an inner diameter of 80 mm, and its magnetic permeability was 100. The structures, other than those described above, were similar to that of the wireless power transmission apparatus 300 related to the example 2.

(Measurement Result of Example 3)

Next, the following describes the magnetic field strength, the transmission characteristic "S21", and the power transmission efficiency resulted from the measurement conducted on the wireless power transmission apparatus 400 related to the example 3.

First, using the network analyzer 110, the transmission characteristic "S21" of the wireless power transmission apparatus 400 related to the example 3 was measured with various frequencies of the AC power supplied to the wireless power transmission apparatus 400.

Figure 12:
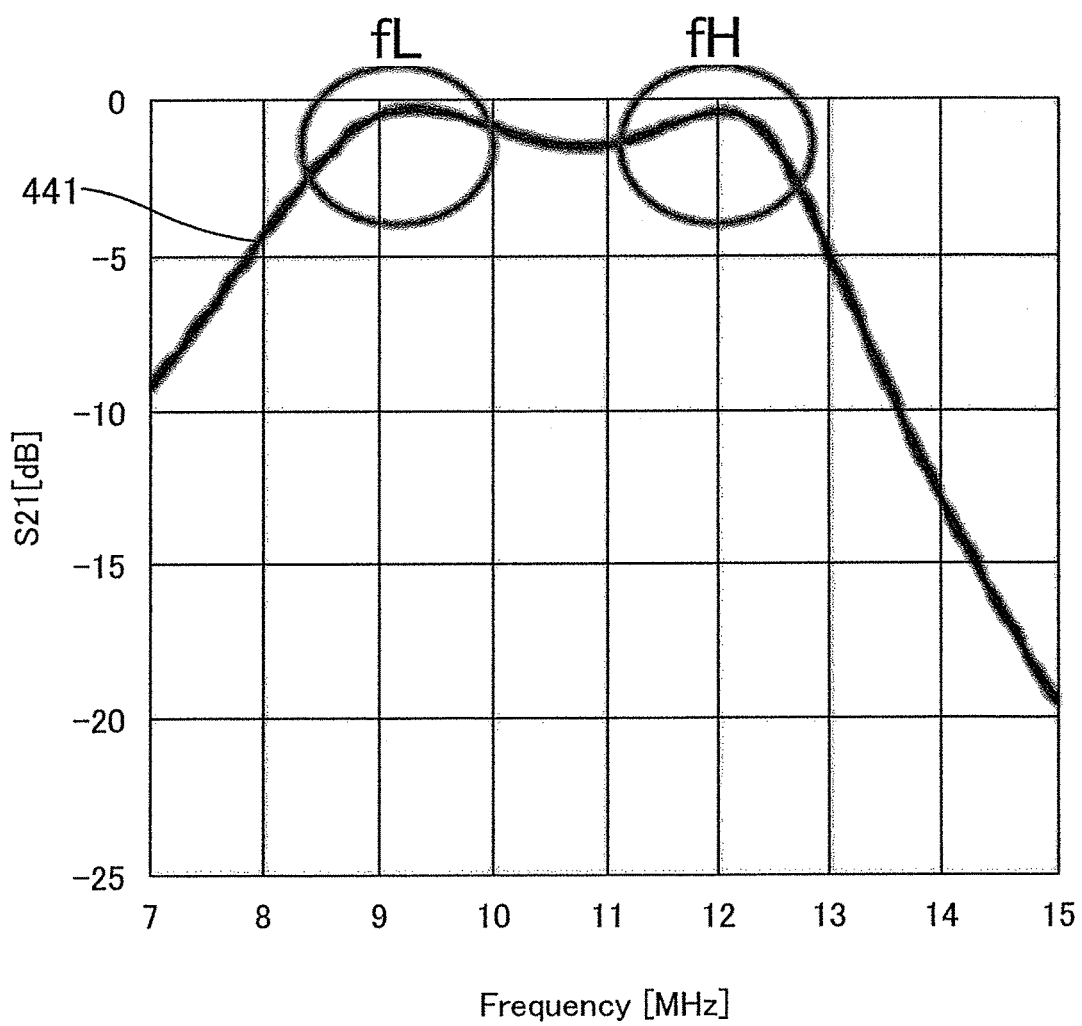
FIG. 12 is a graph indicating measurement results of a transmission characteristic S21 related to the example 3

The measurement of the transmission characteristic "S21" resulted in a waveform 441 having separate peaks; one on a low frequency side and another on a high frequency side, as shown in FIG. 12. Of the separate peaks, the frequency on the high frequency side is indicated as fH, and the frequency on the low frequency side is indicated as fL.

The distribution of the magnetic field strength in the case of setting the frequency of the AC power to the power-supplying module 402 to the frequency fL nearby the peak on the low frequency side (inphase resonance mode) is shown in FIG. 13 (A). From this distribution of magnetic field strength shown in FIG. 13 (A), it is confirmed that the magnetic field on the inner circumference side of the power-supplying resonator 22 and the power-receiving resonator 32 is slightly weakened, compared to that in the case of the comparative example (see FIG. 4 (A)). It is further confirmed that the magnetic field leaking outside, around the power-supplying resonator 22 and the power-receiving resonator 32, is reduced as compared with the example 1 (see FIG. 7(A)). It is further confirmed that the magnetic field leaking to the side surfaces of the power-supplying resonator 22 and the power-receiving resonator 32 is reduced as compared with the example 2 (see FIG. 10(A)).

Meanwhile, the distribution of the magnetic field strength in the case of setting the frequency of the AC power to the power-supplying module 402 to the frequency fH nearby the peak on the high frequency side (antiphase resonance mode) is shown in FIG. 13 (B). From this distribution magnetic field strength shown in FIG. 13(B), it is confirmed that the magnetic field on the inner circumference side of the power-supplying resonator 22 and the power-receiving resonator 32 is significantly weakened, compared to that in the case of the comparative example (see FIG. 4(B)). It is further confirmed that the magnetic field leaking outside, around the power-supplying resonator 22 and the power-receiving resonator 32, is reduced as compared with the example 1 (see FIG. 7(B)). It is further confirmed that the magnetic field leaking to the side surfaces of the power-supplying resonator 22 and the power-receiving resonator 32 is reduced as compared with the example 2 (see FIG. 10(A)).

Next, with the use of the network analyzer 110, measurement of the power transmission efficiency was conducted for the wireless power transmission apparatus 400 related to the example 3, both in the inphase and the antiphase resonance modes. The measurement results are shown in FIG. 14.

As shown in FIG. 14, the power transmission efficiency of the example 3 in the inphase resonance mode (fL) was 97% (see FIG. 14: ■451). Further, the power transmission efficiency in the antiphase resonance mode (fH) was 94% (see FIG. 14: ●452). As should be understood from this, the wireless power transmission apparatus 400 in the example 3 resulted in a better power transmission efficiency than those of the wireless power transmission apparatus 100 in the comparative example 1, the wireless power transmission apparatus 200 in the example 1, and the wireless power transmission apparatus 300 of the example 2. In other words, the provision of the magnetic members 23 and 33, the magnetic members 24 and 34, and the magnetic member 25 and 35 as in the wireless power transmission apparatus 400 improves the power transmission efficiency as compared with the wireless power transmission apparatus 300 in which the magnetic members 23 and 33, and the magnetic members 24 and 34 are arranged only on the inner and the outer circumferential surface sides of the power-supplying resonator 22 and the power-receiving resonator 32.

SECOND EXAMPLE

The above described wireless power transmission apparatuses 200, 300, and 400 of the first example each adopted a circular coil and a cylindrical coil having a shape of solenoid, with a circular cross section for the power-supplying coil and the power-supplying resonator in the power-supplying module and for the power-receiving coil and the power-receiving resonator in the power-receiving module. A second example however deals with a wireless power transmission apparatus adopting a coil in a shape of a quadrangular shape and a coil in a shape of a quadrangular tube, for the power-supplying coil and the power-supplying resonator in the power-supplying module and for the power-receiving coil and the power-receiving resonator in the power-receiving module. Specifically, measurements of the transmission characteristic "S21" and the power transmission efficiency were conducted for a wireless power transmission apparatus 1200 and a wireless power transmission apparatus 1100 (Hereinafter, second comparative example). In each of the wireless power transmission apparatus 1200 and the wireless power transmission apparatus 1100, the power-supplying resonator in the power-supplying module and the power-receiving resonator in the power-receiving module were arranged so as to face each other. In the wireless power transmission apparatus 1200, a tubular magnetic member in a shape of a quadrangular prism was provided on the inner circumferential surface side of the coil of each of the power-supplying resonator and the power-receiving resonator so as to cover the entire inner circumferential surface of each coil. The magnetic member was not arranged in the wireless power transmission apparatus 1100.

(Structure of Wireless Power Transmission Apparatus 1100 Related to Second Comparative Example)

Figure 15:
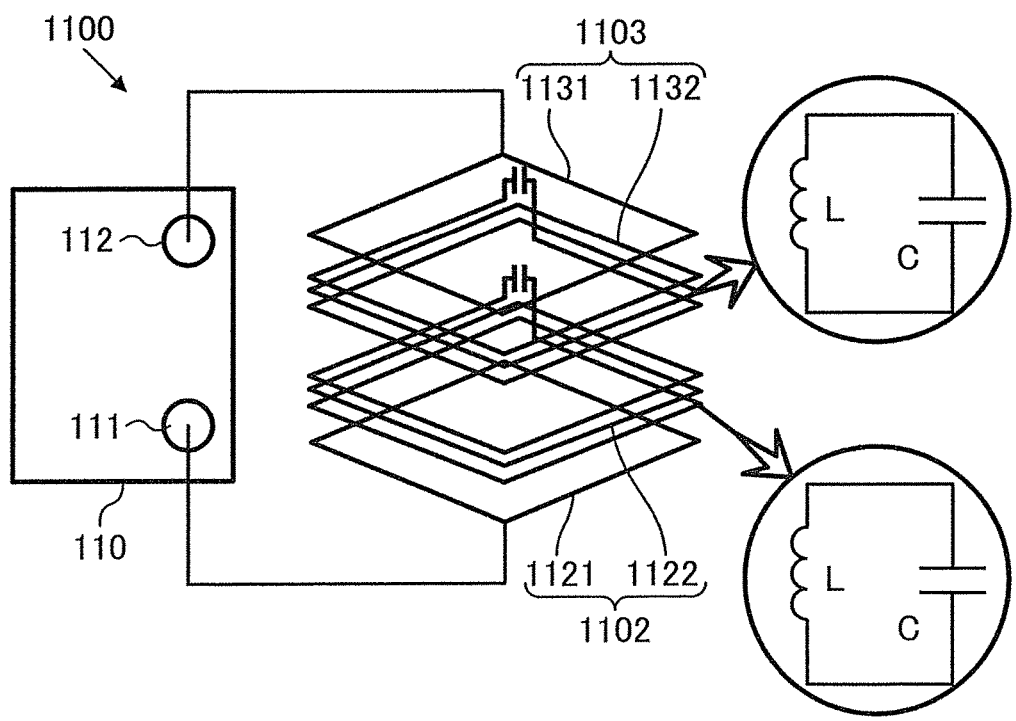
FIG. 15 is a diagram showing a structure of a wireless power transmission apparatus related to a second comparative example.

As shown in FIG. 15, the wireless power transmission apparatus 1100 used in the second comparative example included a power-supplying module 1102 and a power-receiving module 1103. The power-supplying module 1102 included a quadrangular power-supplying coil 1121 and a power-supplying resonator 1122 having a structure of a quadrangular tubular coil. The power-receiving module 1103 included: a quadrangular power-receiving coil 1131 and a power-receiving resonator 1132 having a structure of a quadrangular tubular coil. As in the first example, the power-supplying coil 1121 was connected to the output terminal 111 of the network analyzer 110, and the power-receiving coil 1131 was connected to the input terminal 112 of the network analyzer 110.

The power-supplying coil 1121 plays a role of supplying power obtained from the network analyzer 110 to the power-supplying resonator 1122 by means of electromagnetic induction. This power-supplying coil 1121 was formed in a square shape with each side being 100 mm, by winding once a copper wire material (coated by insulation film) having a wire diameter of 1 mm$\phi$.

The power-receiving coil 1131 plays a role of outputting the power transmitted as magnetic field energy from the power-supplying resonator 1122 to the power-receiving resonator 1132 to the input terminal 112 of the network analyzer 110 by means of electromagnetic induction. This power-receiving coil 1131 was formed in a square shape with each side being 100 mm, by winding once a copper wire material (coated by insulation film) having a wire diameter of 1 mm$\phi$, as in the case of the power-supplying coil 1121.

The power-supplying resonator 1122 and the power-receiving resonator 1132 are each an LC resonance circuit, and play a role of creating the magnetic field resonant state. The power-supplying resonator 1122 and the power-receiving resonator 1132 each had a structure of a quadrangular tubular coil with each side of its cross section being 100 mm, and is formed by winding three times a copper wire material (coated by insulation film) having a wire diameter of 1 mm$\phi$.

The distance between the power-supplying coil 1121 and the power-supplying resonator 1122 was set to be 15 mm, the distance between the power-supplying resonator 1122 and the power-receiving resonator 1132 was set to be 30 mm, and the distance between the power-receiving resonator 1132 and the power-receiving coil 1131 was set to be 15 mm. The resonance frequency of the power-supplying resonator 1122 and the power-receiving resonator 1132 was set to 14.2 MHz. The power-supplying resonator 1122 and the power-receiving resonator 1132 were arranged so that their coil surfaces face each other in parallel.

(Structure of Wireless Power Transmission Apparatus 1200 Related to Second Example)

Figure 16:
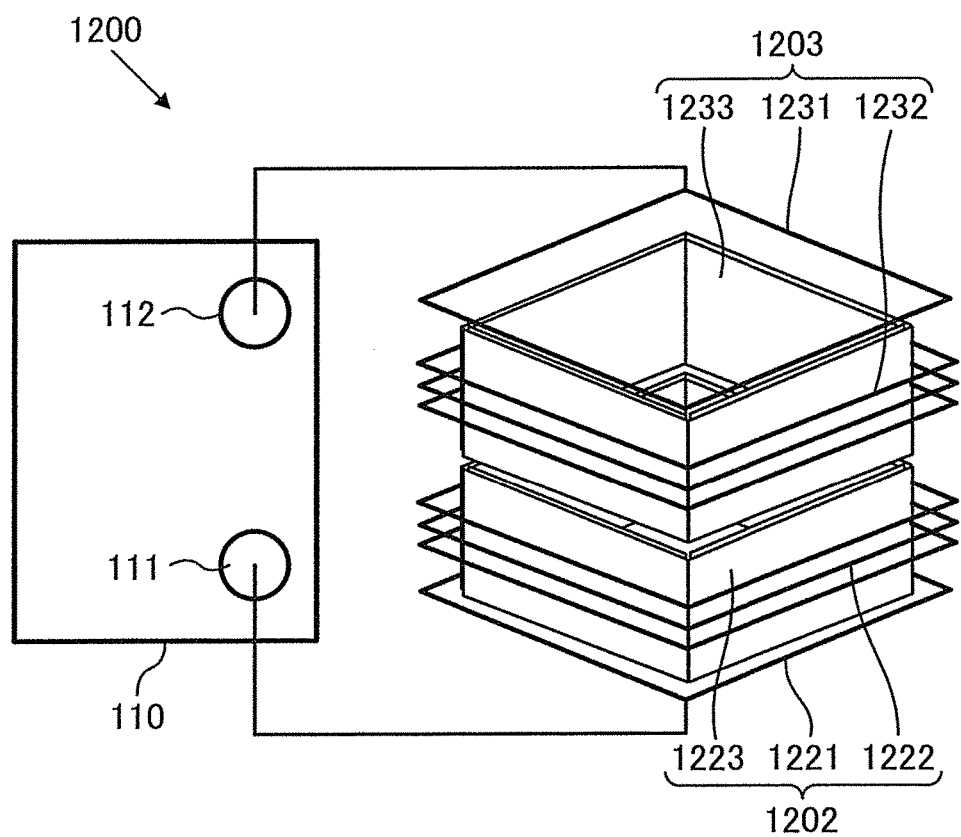
FIG. 16 is a diagram showing a structure of a wireless power transmission apparatus related to second example.

As shown in FIG. 16, the wireless power transmission apparatus 1200 used in the second example included a power-supplying module 1202 and a power-receiving module 1203. The power-supplying module 1202 included: a quadrangular power-supplying coil 1221, a power-supplying resonator 1222 having a structure of a quadrangular tubular coil, and a quadrangular tubular magnetic member 1223 which covered the entire inner circumferential surface of the coil of the power-supplying resonator 1222. The power-receiving module 1203 included: a quadrangular power-receiving coil 1231, a power-receiving resonator 1232 having a structure of a quadrangular tubular coil, and a quadrangular tubular magnetic member 1233 which covered the entire circumferential surface of the coil of the power-receiving resonator 1232. As in the second comparative example, the power-supplying coil 1221 was connected to the output terminal 111 of the network analyzer 110, and the power-receiving coil 1231 was connected to the input terminal 112 of the network analyzer 110.

The magnetic members 1223 and 1233 were each formed by a resin in which magnetic powder was dispersed as in the case of the first example. These magnetic members 1223 and 1233 were formed in a shape of a quadrangular tube, with a thickness of 1 mm, a length of each outer side of 82 mm, a length of each inner side of 80 mm, and a height of 30 mm, and its magnetic permeability is 100. The structures of the power-supplying coil 1221, the power-supplying resonator 1222, the power-receiving coil 1231, and the power-receiving resonator 1232, other than those described above, were the same as those in the wireless power transmission apparatus 1100 related to the second comparative example.

(Measurement Results of Second Comparative Example and Second Example)

The following describes measurement results of the transmission characteristic "S21" of the wireless power transmission apparatus 1100 related to the second comparative example, and the measurement results of the transmission characteristic "S21" of the wireless power transmission apparatus 1200 related to the second example.

Using the network analyzer 110, the transmission characteristic "S21" of the wireless power transmission apparatus 1100 related to the second comparative example was measured with various frequencies of the AC power supplied to the wireless power transmission apparatus 1100. Similarly, the transmission characteristic "S21" of the wireless power transmission apparatus 1200 related to the second example was measured with various frequencies of the AC power to the wireless power transmission apparatus 1200. Note that, as already mentioned, the transmission characteristic "S21" is indicated in units of decibel and indicates signals out of those from the output terminal 111 having passed the input terminal 112. Therefore, the higher the value, the higher the power transmission efficiency is. Further, as already mentioned, the power transmission efficiency means a ratio of the power received by the power-receiving module of the power transmitted from the power-supplying module. In this case, it means a ratio of the power output to the input terminal 112 for the power supplied from the output terminal 111 to the power-supplying module, while the wireless power transmission apparatus 101 is connected to the network analyzer 110.

Figure 17A:
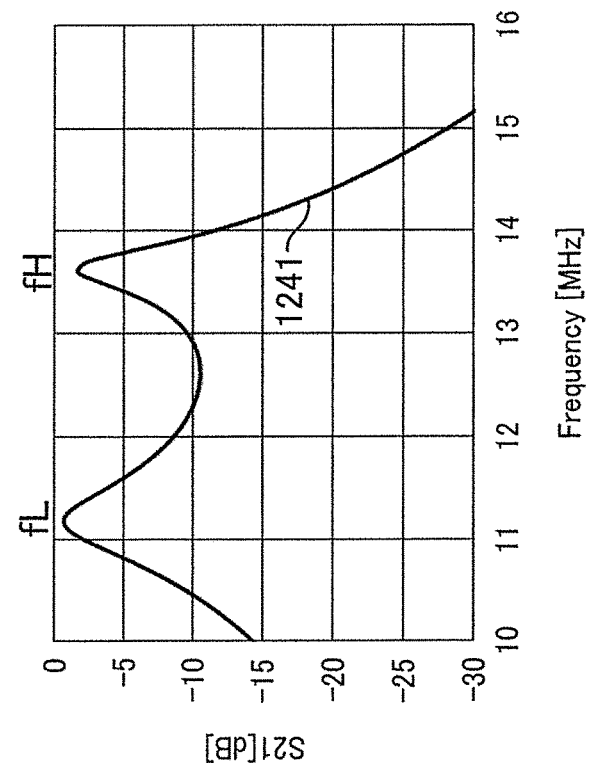
FIGS. 17(A) and 17(B) are graphs indicating the measurement results of the transmission characteristic S21 related to the second comparative example and the second example.

The measurement of the transmission characteristic "S21" in the second comparative example resulted in a waveform 1141 having separate peaks; one on a low frequency side and another on a high frequency side, as shown in FIG. 17(A). Of the separate peaks, the frequency on the high frequency side is indicated as fH, and the frequency on the low frequency side is indicated as fL.

Figure 17B:
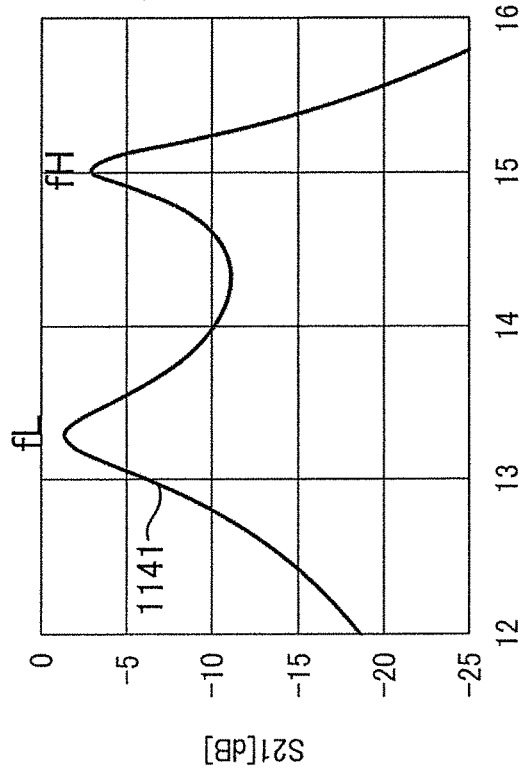

Meanwhile, the measurement of the transmission characteristic "S21" in the second example resulted in a waveform 1241 having separate peaks; one on a low frequency side and another on a high frequency side, as shown in FIG. 17(B). The value of the transmission characteristic "S21" at the frequency fH nearby the separated-peak on the high frequency side and the value of the transmission characteristic "S21" at the frequency fL nearby the separated-peak on the low frequency side were both higher than those in the resulting waveform 1141 (see FIG. 17 (A)) in the second comparative example. As should be understood from this, the wireless power transmission apparatus 1200 in the second example resulted in a better power transmission efficiency than that of the wireless power transmission apparatus 1100 in the second comparative example. From the measurement results of the transmission characteristic "S21", it should be understood that, with the structure having the magnetic members 1223 and 1233, the power transmission efficiency is improved, when compared to the wireless power transmission apparatus 1100 not having the magnetic members 1223 and 1233 on side of the inner circumferential surface of the power-supplying resonator 1122 and the power-receiving resonator 1132, even when the shapes of the power-supplying coil 1221 and the coil of the power-supplying resonator 1222 in the power-supplying module 1202 and the power-receiving coil 1231 and the coil of the power-receiving resonator 1232 in the power-receiving module 1203 are formed in a quadrangular shape or in a shape of a quadrangular tube.

Figure 18:
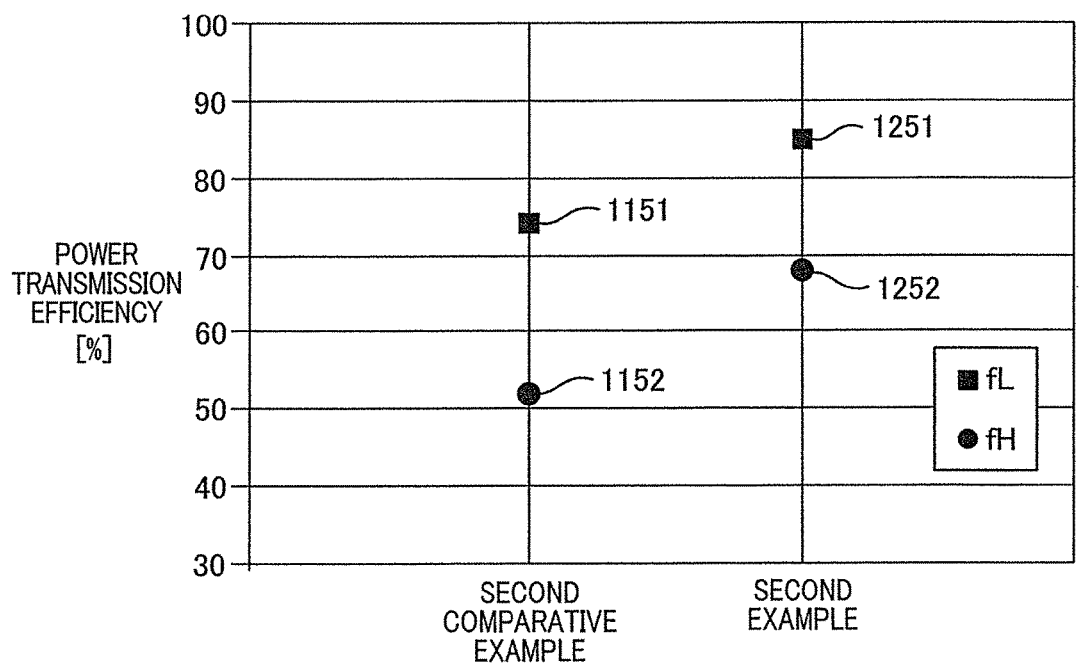
FIG. 18 is a graph indicating measurement results of the power transmission efficiencies related to the second comparative example and the second example.

Using the network analyzer 110, measurement of the power transmission efficiency was conducted for the wireless power transmission apparatus 1100 related to the second comparative example, both in the inphase resonance mode and the antiphase resonance mode. In the meantime, measurement of the power transmission efficiency was conducted for the wireless power transmission apparatus 1200 related to the second example, both in the inphase and the antiphase resonance modes. The measurement results are shown in FIG. 18. Along the horizontal axis of the graph of FIG. 18, the results of the second comparative example and the second example are aligned. The vertical axis of the graph shows the resulting power transmission efficiency [%].

As the result of the measurement, the power transmission efficiency in the inphase resonance mode (fL) for the second comparative example was 74.3% as shown in FIG. 18 (see FIG. 18: ■1151). Further, the power transmission efficiency in the antiphase resonance mode (fH) was 51.8% (see FIG. 18: ●1152).

In the second example, the power transmission efficiency in the inphase resonance mode (fL) was 85.2% (see FIG. 18: ■1251). The power transmission efficiency in the antiphase resonance mode (fH) was 67.9% (see FIG. 18: ●1252). As should be understood from this, the wireless power transmission apparatus 1200 of the second example results in a better power transmission efficiency than the wireless power transmission apparatus 1100 of the second comparative example. That is, with the provision of the magnetic members 1223 and 1233 as in the case of the wireless power transmission apparatus 1200 improves the power transmission efficiency, as compared with the wireless power transmission apparatus 1100 in which the magnetic members 1223 and 1233 are not arranged on the inner circumferential surface sides of the power-supplying resonator 1122 and the power-receiving resonator 1132.

THIRD EXAMPLE

Figure 19:
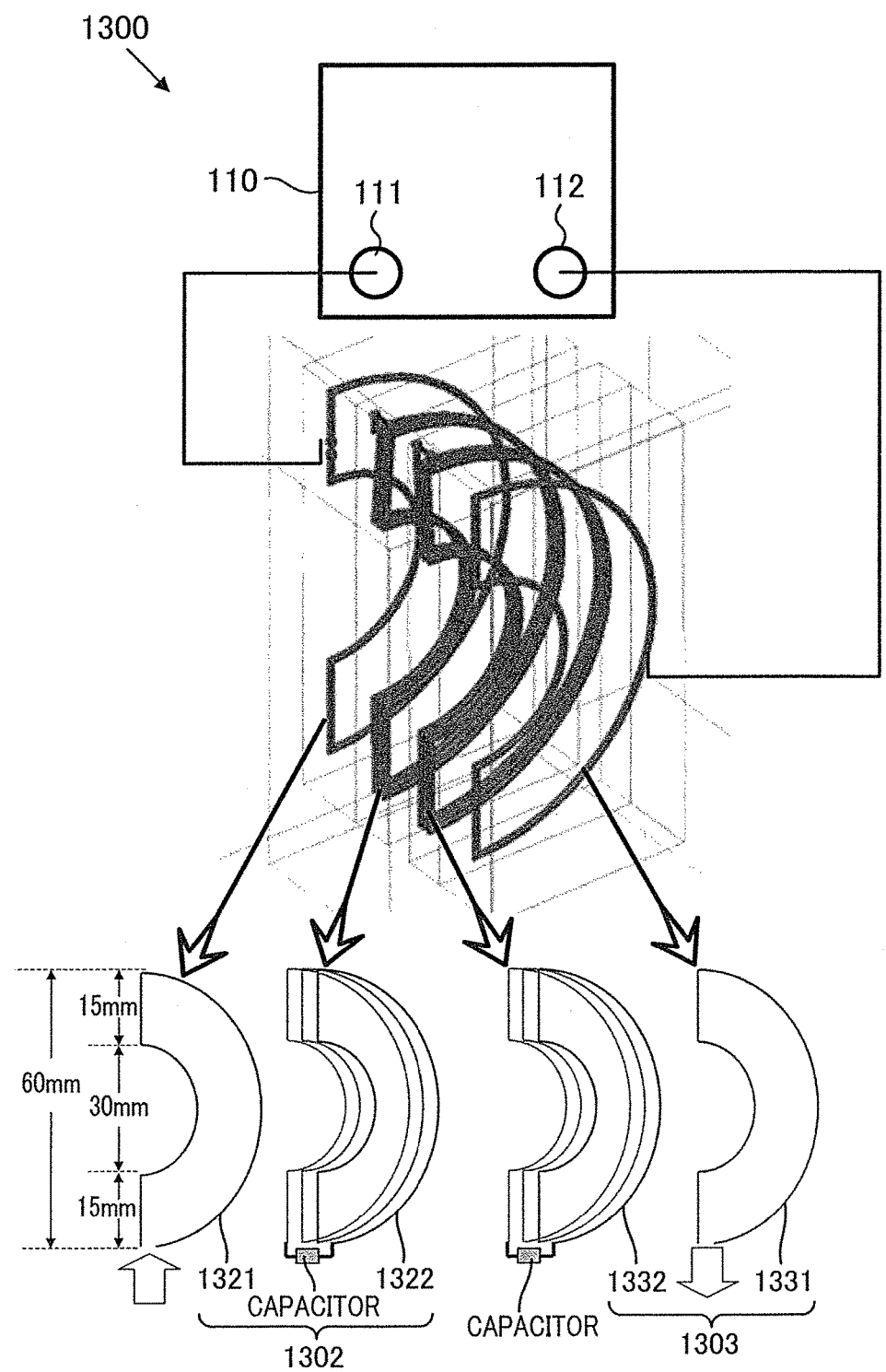
FIG. 19 is a diagram showing a structure of a wireless power transmission apparatus related to a third comparative example.

The wireless power transmission apparatuses 200, 300, and 400 of the above-described first example each adopted a coil in a circular shape and a cylindrical coil having a solenoid shape of a quadrangular shape, for the power-supplying coil and the power-supplying resonator in the power-supplying module and for the power-receiving coil and the power-receiving resonator in the power-receiving module. Further, the wireless power transmission apparatus 1200 of the second example adopted a coil in a quadrangular shape and a coil in a quadrangular tubular shape, for the power-supplying coil and the power-supplying resonator in the power-supplying module and for the power-receiving coil and the power-receiving resonator in the power-receiving module. The third example however deals with a case of a wireless power transmission apparatus adopting a coil having a crescent shape and a coil in a shape of a crescent tube for the power-supplying coil and the power-supplying resonator in the power-supplying module and for the power-receiving coil and the power-receiving resonator in the power-receiving module, as shown in FIG. 19. Specifically, the power-supplying resonator in the power-supplying module and the power-receiving resonator in the power-receiving module were arranged to face each other. In the wireless power transmission apparatus 1400, a crescent tubular magnetic member covering the entire inner circumferential surface of the coil was arranged on the inner circumferential surface side of the coil of each of the power-supplying resonator and the power-receiving resonator. The wireless power transmission apparatus 1300 (hereinafter, third comparative example) on the other hand had no magnetic member. For these wireless power transmission apparatuses, the transmission characteristic "S21" and the power transmission efficiency were measured. This is described below.

(Structure of Wireless Power Transmission Apparatus 1300 Related to Third Comparative Example)

As shown in FIG. 19, the wireless power transmission apparatus 1300 of the third comparative example included power-supplying module 1302 and a power-receiving module 1303. The power-supplying module 1302 included a power-supplying coil 1321 in a crescent shape and a power-supplying resonator 1322 having a structure of a crescent tubular coil. The power-receiving module included a power-receiving coil 1331 in a crescent shape and a power-receiving resonator 1332 having a structure of a crescent tubular coil. As in the first example, the power-supplying coil 1321 was connected to the output terminal 111 of the network analyzer 110, and the power-receiving coil 1331 was connected to the input terminal 112 of the network analyzer 110.

The power-supplying coil 1321 plays a role of supplying power obtained from the network analyzer 110 to the power-supplying resonator 1322 by means of electromagnetic induction. The power-supplying coil 1321 was formed by winding once a copper wire material (coated by insulation film) having a wire diameter of 1 mmφ. It has a crescent shape such that the diameter of the outer circle was 60 mm and the diameter of the inner circle was 30 mm, as shown in FIG. 19.

The power-receiving coil 1331 plays a role of outputting the power transmitted as magnetic field energy from the power-supplying resonator 1322 to the power-receiving resonator 1332 to the input terminal 112 of the network analyzer 110 by means of electromagnetic induction. The power-receiving coil 1331 was formed by winding once a copper wire material (coated by insulation film) having a wire diameter of 1 mmφ. It has a crescent shape such that the diameter of the outer circle was 60 mm and the diameter of the inner circle was 30 mm, as in the case of the power-supplying coil 1321.

The power-supplying resonator 1322 and the power-receiving resonator 1332 are each an LC resonance circuit, and play a role of creating the magnetic field resonant state. The power-supplying resonator 1322 and the power-receiving resonator 1332 were each formed by winding three times a copper wire material (coated by insulation film) having a wire diameter of 1 mmφ (at intervals of 0.1 mm between windings). The power-supplying resonator 1322 and the power-receiving resonator 1332 each had a structure of a crescent tubular coil such that the diameter of the outer circle was 60 mm and the diameter of the inner circle was 30 mm.

The distance between the power-supplying coil 1321 and the power-supplying resonator 1322 was set to 10 mm, the distance between the power-supplying resonator 1322 and the power-receiving resonator 1332 was set to 8 mm, and the distance between the power-receiving resonator 1332 and the power-receiving coil 1331 was set to 10 mm. The resonance frequency of the power-supplying resonator 1322 and the power-receiving resonator 1332 was set to 15.5 MHz. The power-supplying resonator 1322 and the power-receiving resonator 1332 were arranged so that the coil surfaces of the power-supplying resonator 1322 and the power-receiving resonator 1332 were parallel and faced each other.

(Structure of Wireless Power Transmission Apparatus 1400 Related to Third Example)

Figure 20:
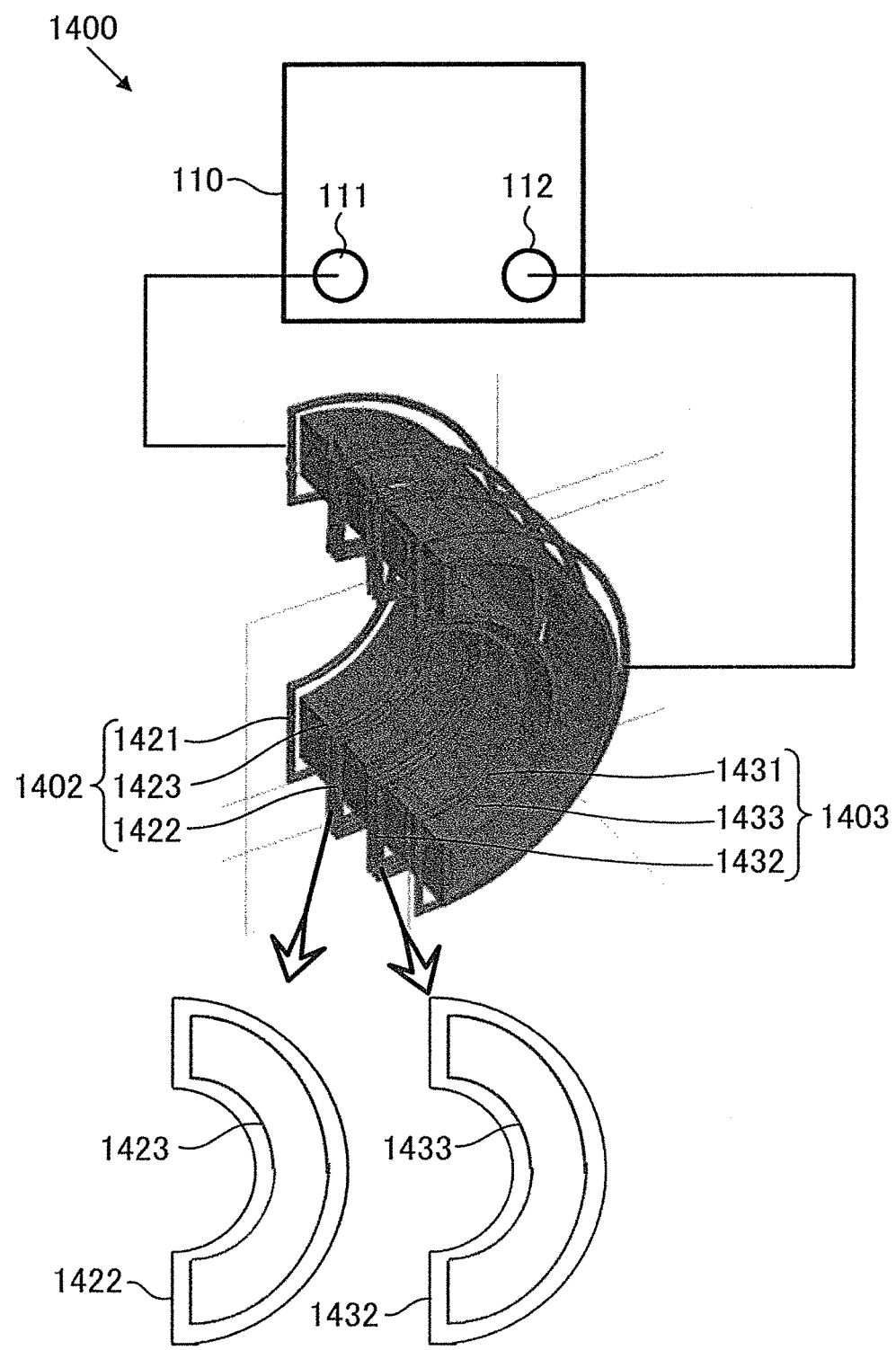
FIG. 20 is a diagram showing a structure of a wireless power transmission apparatus related to a third example.

As shown in FIG. 20, the wireless power transmission apparatus 1400 used in the third example included a power-supplying module 1402 and a power-receiving module 1403. The power-supplying module 1402 included a power-supplying coil 1421 in a crescent shape, a power-supplying resonator 1422 having a structure of a crescent tubular coil, and a crescent tubular magnetic member 1423 which covered the entire inner circumferential surface of the coil of the power-supplying resonator 1422. The power-receiving module 1403 included a power-receiving coil 1431 in a crescent shape, a power-receiving resonator 1432 having a structure of a crescent tube, a crescent tubular magnetic member 1433 which covered the entire inner circumferential surface of the coil of the power-receiving resonator 1432. As in the third comparative example, the power-supplying coil 1421 was connected to the output terminal 111 of the network analyzer 110 and the power-receiving coil 1431 was connected to an input terminal 112 of the network analyzer 110.

The magnetic members 1423 and 1433 were formed by a resin in which magnetic powder was dispersed as in the case of the first example. These magnetic members 1423 and 1433 each had a shape of a crescent tube with a thickness of 1 mm, whose outline matched with the inner circumferential surface of the power-supplying resonator 1422 and power-receiving resonator 1432. The magnetic permeability was 100. The structures of the power-supplying coil 1421, the power-supplying resonator 1422, the power-receiving coil 1431, and the power-receiving resonator 1432, other than those described above were the same as those of the wireless power transmission apparatus 1300 of the third comparative example.

(Measurement Results of Third Comparative Example and Third Example)

The following describes measurement results of the transmission characteristic "S21" of the wireless power transmission apparatus 1300 related to the third comparative example, and the measurement results of the transmission characteristic "S21" of the wireless power transmission apparatus 1400 related to the third example.

First, using the network analyzer 110, the transmission characteristic "S21" of the wireless power transmission apparatus 100 related to the third comparative example was measured at various frequencies of the AC power to the wireless power transmission apparatus 1300. Similarly, the transmission characteristic "S21" of the wireless power transmission apparatus 1400 related to the third example was measured with various frequencies of the AC power to the wireless power transmission apparatus 1400.

The measurement of the transmission characteristic "S21" in the third comparative example resulted in a waveform 1341 having separate peaks; one on a low frequency side and another on a high frequency side, as shown in FIG. 21(A). Of the separate peaks, the frequency on the high frequency side is indicated as fH, and the frequency on the low frequency side is indicated as fL.

Meanwhile, the measurement of the transmission characteristic "S21" in the third example resulted in a waveform 1441 having separate peaks; one on a low frequency side and another on a high frequency side, as shown in FIG. 21(B). The value of the transmission characteristic "S21" at the frequency fH nearby the separated-peak on the high frequency side and the value of the transmission characteristic "S21" at the frequency fL nearby the separated-peak on the low frequency side were both higher than those in the resulting waveform 1341 (see FIG. 21 (A)) in the third comparative example. From this, it should be understood that the power transmission efficiency of the wireless power transmission apparatus 1400 in the third example is improved as compared with that of the wireless power transmission apparatus 1300 related to the third comparative example. From the measurement results of the transmission characteristic "S21", it should be understood that, with the structure having the magnetic members 1423 and 1433, the power transmission efficiency is improved, when compare to the wireless power transmission apparatus 1300 not having the magnetic members 1423 and 1433 on side of the inner circumferential surface of the power-supplying resonator 1322 and the power-receiving resonator 1332, even when the shapes of the power-supplying coil 1421 and the coil of the power-supplying resonator 1422 in the power-supplying module 1402 and the power-receiving coil 1431 and the coil of the power-receiving resonator 1432 in the power-receiving module 1403 are formed in a crescent shape or in a shape of a crescent tube.

Figure 22:
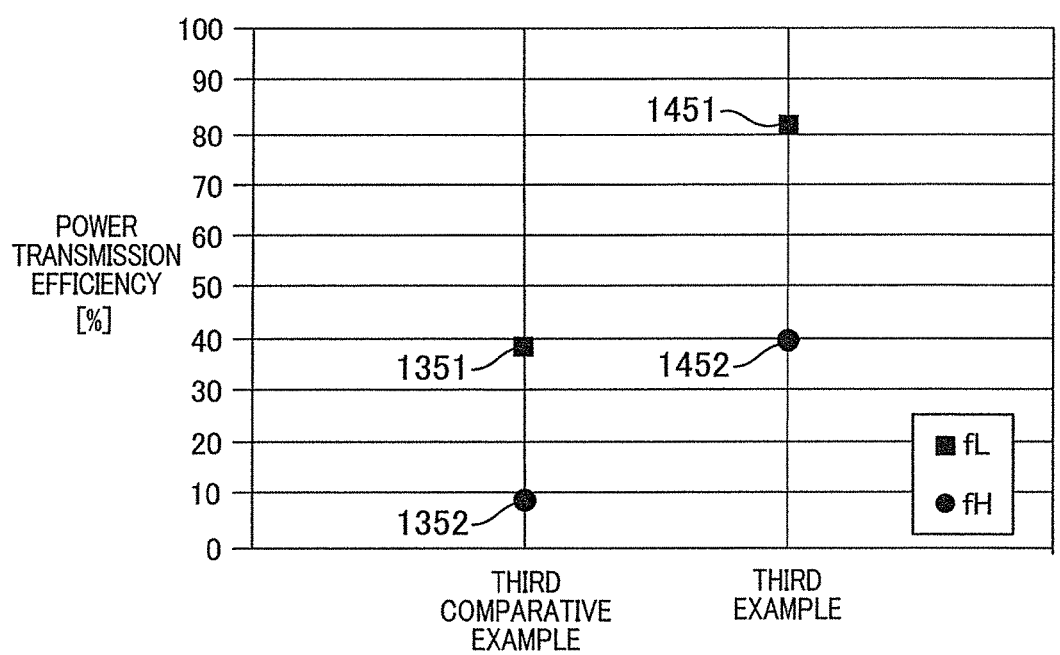
FIG. 22 is a graph indicating measurement results of the power transmission efficiencies related to the third comparative example and the third example.

Using the network analyzer 110, measurement of the power transmission efficiency was conducted for the wireless power transmission apparatus 1300 related to the third comparative example, both in the inphase resonance mode and the antiphase resonance mode. In the meantime, measurement of the power transmission efficiency was conducted for the wireless power transmission apparatus 1400 related to the third example, both in the inphase and the antiphase resonance modes. The measurement results are shown in FIG. 22. Along the horizontal axis of the graph of FIG. 22, the results of the third comparative example and the third example are aligned. The vertical axis of the graph shows the resulting power transmission efficiency [%].

As the result of the measurement, the power transmission efficiency in the inphase resonance mode (fL) for the third comparative example was 38.7% as shown in FIG. 22 (see FIG. 22: ■1351). Further, the power transmission efficiency in the antiphase resonance mode (fH) was 9.1% (see FIG. 22: ●1352).

In the third example, the power transmission efficiency in the inphase resonance mode (fL) was 82.3% (see FIG. 22: ■1451). Further, the power transmission efficiency in the antiphase resonance mode (fH) was 39.9% (see FIG. 22: ●1452). As should be understood from this, the wireless power transmission apparatus 1400 in the third example resulted in a better power transmission efficiency than that of the wireless power transmission apparatus 1300 in the third comparative example. That is, with the provision of the magnetic members 1423 and 1433 as in the case of the wireless power transmission apparatus 1400 improves the power transmission efficiency, as compared with the wireless power transmission apparatus 1300 in which the magnetic members 1423 and 1433 are not arranged on the inner circumferential surface sides of the power-supplying resonator 1322 and the power-receiving resonator 1332.

FOURTH EXAMPLE

The wireless power transmission apparatuses 200, 300, and 400 of the first example each adopted coils with their coil diameters being set at the same diameter of 100 mmφ. Fourth example however adopts coils with their coil diameters being different from each other, for the power-supplying coil and the power-supplying resonator in the power-supplying module and for the power-receiving coil and the power-receiving resonator in the power-receiving module, as shown in FIG. 23. Specifically, the coil diameters of the power-receiving coil and the power-receiving resonator in the power-receiving module were made smaller than those of the power-supplying coil and the power-supplying resonator in the power-supplying module. Measurements of the transmission characteristic "S21" and the power transmission efficiency were conducted to a wireless power transmission apparatus 1600 and a wireless power transmission apparatus 1500 (Hereinafter, fourth comparative example). In each of the wireless power transmission apparatus 1600 and the wireless power transmission apparatus 1500, the power-supplying resonator in the power-supplying module and the power-receiving resonator in the power-receiving module were arranged so as to face each other. In the wireless power transmission apparatus 1600, a tubular magnetic member in a cylindrical shape was provided on the inner circumferential surface side of the coil of each of the power-supplying resonator and the power-receiving resonator so as to cover the entire inner circumferential surface of each coil. The magnetic member was not arranged in the wireless power transmission apparatus 1500.

(Structure of Wireless Power Transmission Apparatus 1500 Related to Fourth Comparative Example)

As shown in FIG. 23, the wireless power transmission apparatus 1500 used in the fourth comparative example included a power-supplying module 1502 and a power-receiving module 1503. The power-supplying module 1502 included a circular power-supplying coil 1521, and a power-supplying resonator 1522 in a cylindrical shape. The power-receiving module 1503 included a circular power-receiving coil 1531, and a power-receiving resonator 1532 having a cylindrical shape. As in the first example, the power-supplying coil 1521 was connected to the output terminal 111 of the network analyzer 110, and the power-receiving coil 1531 was connected to the input terminal 112 of the network analyzer 110.

The power-supplying coil 1521 plays a role of supplying power obtained from the network analyzer 110 to the power-supplying resonator 1522 by means of electromagnetic induction. This power-supplying coil 1521 was formed by winding once a copper wire material (coated by insulation film) having a wire diameter of 1 mmϕ, and was formed into a circular shape with its inner diameter being 54 mmϕ (see cross sectional view of FIG. 23).

The power-receiving coil 1531 plays a role of outputting, to the input terminal 112 of the network analyzer 110, the power having been transmitted as a magnetic field energy from the power-supplying resonator 1522 to the power-receiving resonator 1532, by means of electromagnetic induction. The power-receiving coil 1531 was formed by winding once a copper wire material (coated by insulation film) having a wire diameter of 1 mmϕ, and was formed into a circular shape with its inner diameter being 36 mmϕ (see cross sectional view of FIG. 23).

The power-supplying resonator 1522 and the power-receiving resonator 1532 are each an LC resonance circuit and play a role of creating a magnetic field resonant state. The power-supplying resonator 1522 was a solenoid coil formed by winding four times a copper wire material (coated by insulation film) having a wire diameter of 1 mmϕ in the form of solenoid, and its inner diameter was set to be 54 mmϕ. The resonance frequency was set to 17.2 MHz (see cross section of FIG. 23). On the other hand, the power-receiving resonator 1532 was formed by winding six times a copper wire material (coated by insulation film) having a wire diameter of 1 mmϕ, and was a solenoid coil with its inner diameter being 36 mmϕ. The resonance frequency was set to 17.2 MHz (see cross sectional view of FIG. 23).

The distance between the power-supplying coil 1521 and the power-supplying resonator 1522 was set to 5 mm, the distance between the power-supplying resonator 1522 and the power-receiving resonator 1532 was set to 18 mm, and the distance between the power-receiving resonator 1532 and the power-receiving coil 1531 was set to 5 mm. The power-supplying resonator 1522 and the power-receiving resonator 1532 were arranged so that the coil surfaces of the power-supplying resonator 1522 and the power-receiving resonator 1532 were parallel and faced each other.

(Structure of Wireless Power Transmission Apparatus 1600 Related to Fourth Example)

Figure 24:
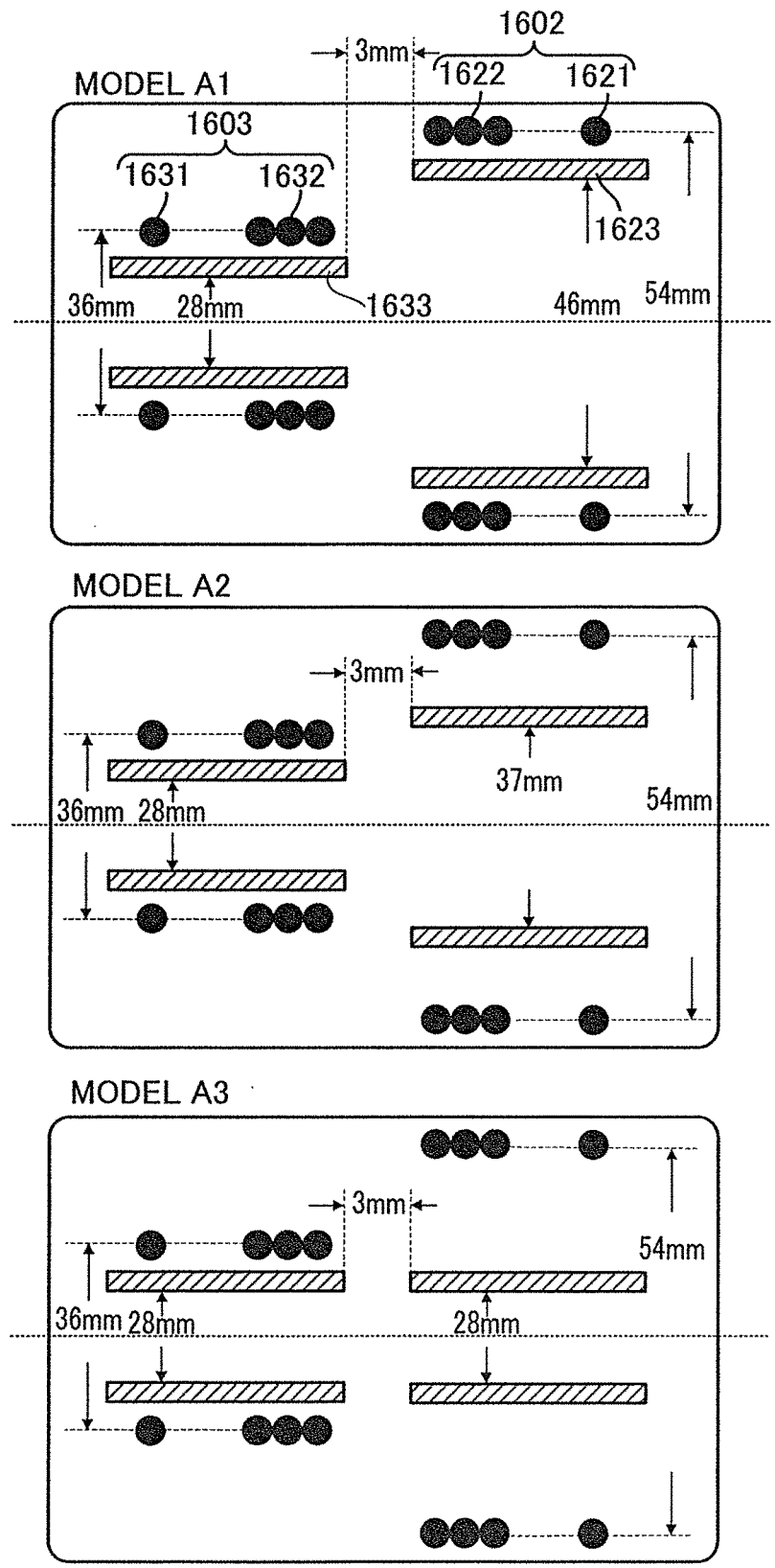
FIG. 24 is a diagram showing a structure of a wireless power transmission apparatus related to a fourth example.

As shown in the cross sectional view of FIG. 24, the wireless power transmission apparatus 1600 used in the fourth example included a power-supplying module 1602 and a power-receiving module 1603. The power-supplying module 1602 included: a circular power-supplying coil 1621, a power-supplying resonator 1622 in a cylindrical shape, and a cylindrical magnetic member 1623 which covered the entire inner circumferential surface of the coil of the power-supplying resonator 1622. The power-receiving module 1603 included a circular power-receiving coil 1631, a power-receiving resonator 1632 in a cylindrical shape, and a cylindrical magnetic member 1633 which covered the entire inner circumferential surface of the coil of the power-receiving resonator 1632. As in the fourth comparative example, the power-supplying coil 1621 was connected to the output terminal 111 of the network analyzer 110, and the power-receiving coil 1631 was connected to the input terminal 112 of the network analyzer 110. Note that the fourth example includes three models (model A1, model A2, and model A3 which are detailed later) with different diameters of the cylindrical magnetic member 1623 which covers the entire inner circumferential surface of the coil of the power-supplying resonator 1622.

The magnetic members 1623 and 1633 were formed by a resin in which magnetic powder was dispersed as in the case of the first example. The magnetic member 1623 of the model A1 had a cylindrical shape, with an inner diameter of 46 mmϕ and a thickness of 1 mm, and its magnetic permeability was 100, as shown in FIG. 24. The magnetic member 1623 of the model A2 had a cylindrical shape, with an inner diameter of 37 mmϕ and a thickness of 1 mm, and its magnetic permeability was 100, as shown in FIG. 24. The magnetic member 1623 of the model A3 had a cylindrical shape, with an inner diameter of 28 mmϕ and a thickness of 1 mm, and its magnetic permeability was 100, as shown in FIG. 24. Note that the magnetic member 1633 of each of the model A1, the model A2, and the model A3 had a cylindrical shape with a common inner diameter of 28 mmϕ, and a thickness of 1 mm, and its magnetic permeability was 100. The structures of the power-supplying coil 1621, the power-supplying resonator 1622, the power-receiving coil 1631, and the power-receiving resonator 1632, other than those described above, were the same as the structures in the wireless power transmission apparatus 1500 related to the fourth comparative example.

(Measurement Results of Fourth Comparative Example and Fourth Example)

The following describes measurement results of the transmission characteristic "S21" of the wireless power transmission apparatus 1500 related to the fourth comparative example, and the measurement results of the transmission characteristic "S21" of the wireless power transmission apparatus 1600 related to the fourth example.

First, using the network analyzer 110, the transmission characteristic "S21" of the wireless power transmission apparatus 1300 related to the fourth comparative example was measured at various frequencies of the AC power to the wireless power transmission apparatus 1500. Similarly, the transmission characteristic "S21" of the wireless power transmission apparatus 1600 related to the fourth example was measured with various frequencies of the AC power to the wireless power transmission apparatus 1600 (measurement conducted for each of the models A1, A2, A3).

Figure 25A:
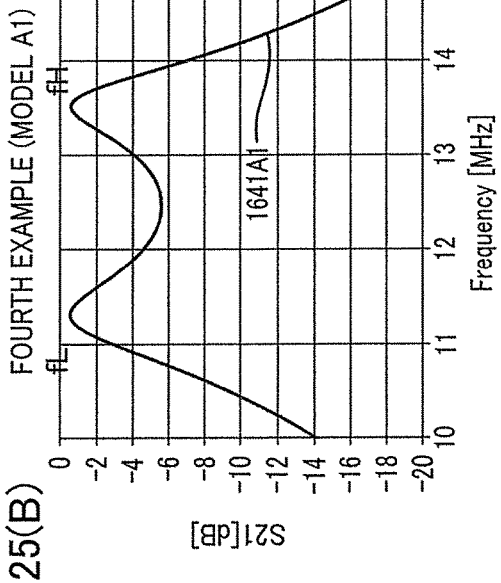
FIGS. 25(A), 25(B), 25(C), and 25(D) are graphs indicating the measurement results of the transmission characteristics S21 related to the fourth comparative example and the fourth example.
Figure 25B:
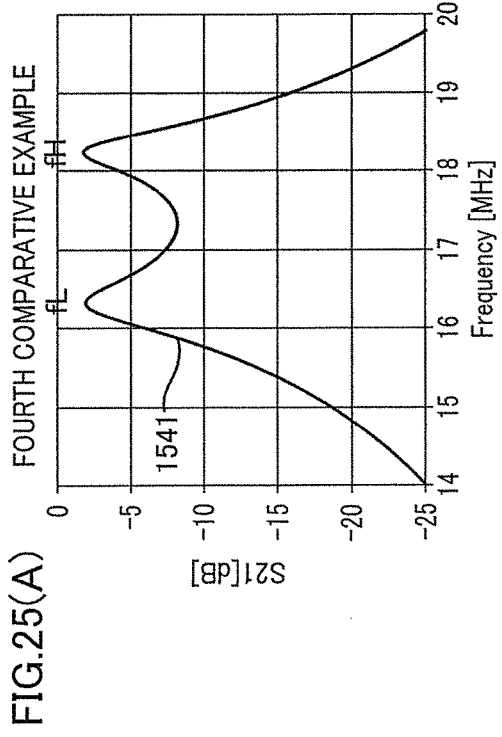
Figure 25C:
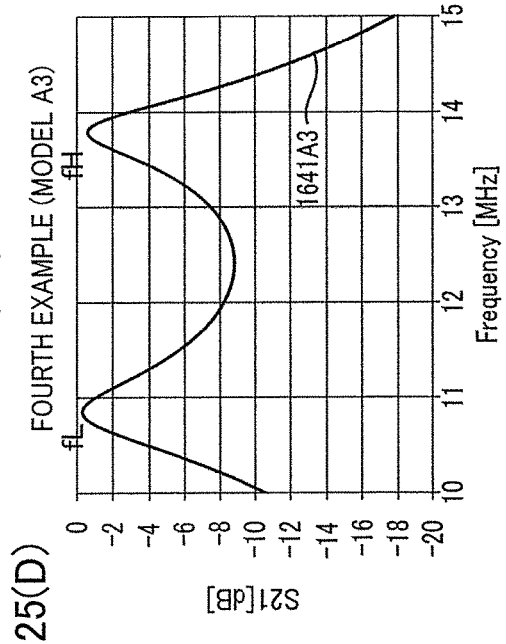
Figure 25D:
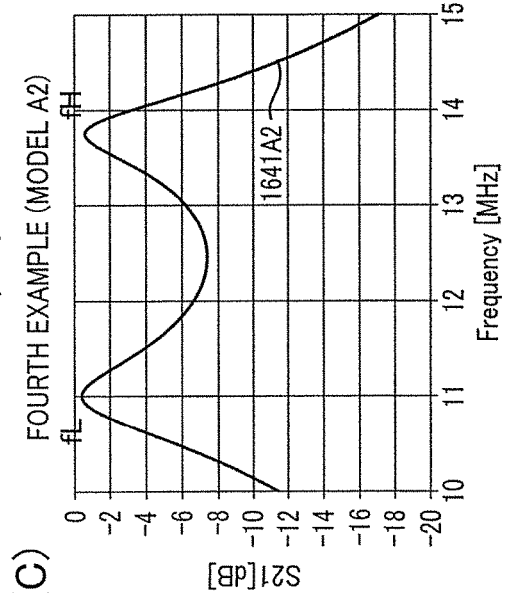

The measurement of the transmission characteristic "S21" in the fourth comparative example resulted in a waveform 1541 having separate peaks; one on a low frequency side and another on a high frequency side, as shown in FIG. 25(A). Of the separate peaks, the frequency on the high frequency side is indicated as fH, and the frequency on the low frequency side is indicated as fL.

Meanwhile, as the result of measurement for the model A1 of the fourth example, the resulting waveform 1641A1 of the measured transmission characteristic "S21" had separate peaks; one on a low frequency side and another on a high frequency side as shown in FIG. 25 (B). The value of the transmission characteristic "S21" at the frequency fH nearby the separated-peak on the high frequency side and the value of the transmission characteristic "S21" at the frequency fL nearby the separated-peak on the low frequency side were both higher than those in the resulting waveform 1541 (see FIG. 25 (A)) in the fourth comparative example.

As the result of measurement for the model A2 of the fourth example, the resulting waveform 1641A2 of the measured transmission characteristic "S21" had separate peaks; one on a low frequency side and another on a high frequency side as shown in FIG. 25 (C). The value of the transmission characteristic "S21" at the frequency fH nearby the separated-peak on the high frequency side and the value of the transmission characteristic "S21" at the frequency fL nearby the separated-peak on the low frequency side were both higher than those in the resulting waveform 1541 (see FIG. 25(A)) in the fourth comparative example.

As the result of measurement for the model A3 of the fourth example, the resulting waveform 1641A3 of the measured transmission characteristic "S21" had separate peaks; one on a low frequency side and another on a high frequency side, as shown in FIG. 25 (D). The value of the transmission characteristic "S21" at the frequency fH nearby the separated-peak on the high frequency side and the value of the transmission characteristic "S21" at the frequency fL nearby the separated-peak on the low frequency side were both higher than those in the resulting waveform 1541 (see FIG. 25(A)) in the fourth comparative example.

As should be understood from this, the wireless power transmission apparatus 1600 in the fourth example resulted in a better power transmission efficiency than that of the wireless power transmission apparatus 1500 in the fourth comparative example. That is, from the measurement results of the transmission characteristic "S21", it should be understood that, with the provision of the magnetic members 1623 and 1633 as described above, the power transmission efficiency is improved, as compared with the wireless power transmission apparatus 1500 in which the magnetic members 1623 and 1633 are not arranged on the inner circumferential surface sides of the power-supplying resonator 1522 and the power-receiving resonator 1532, even when the coil diameters of the power-supplying coil 1621 and the power-supplying resonator 1622 in the power-supplying module 1602, the power-receiving coil 1631 and the power-receiving resonator 1632 in the power-receiving module 1603 are different.

Figure 26:
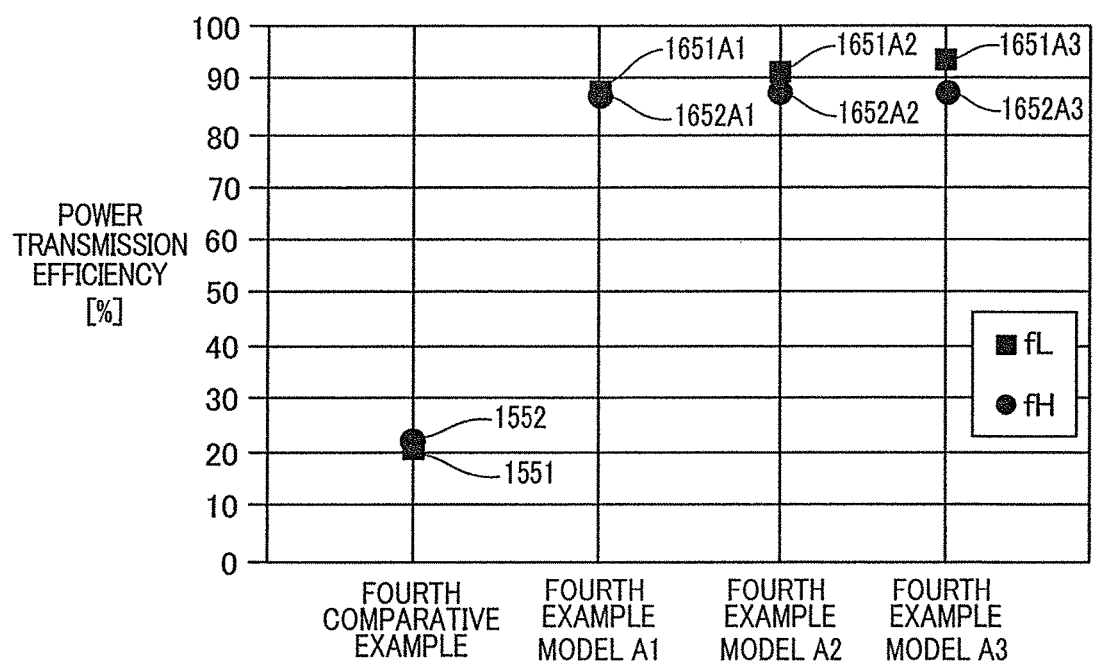
FIG. 26 is a graph indicating the measurement results of the power transmission efficiencies related to the fourth comparative example and the fourth example.

Using the network analyzer 110, measurement of the power transmission efficiency was conducted for the wireless power transmission apparatus 1500 related to the fourth comparative example, both in the inphase resonance mode and the antiphase resonance mode. In the meantime, measurement of the power transmission efficiency was conducted for the wireless power transmission apparatus 1600 (model A1, model A2, model A3) related to the fourth example, both in the inphase and the antiphase resonance modes. The measurement results are shown in FIG. 26. Along the horizontal axis of the graph of FIG. 26, the results of the fourth comparative example and the models A1, A2, and A3 of the fourth example are aligned. The vertical axis of the graph shows the resulting power transmission efficiency [%].

As the result of the measurement, the power transmission efficiency in the inphase resonance mode (fL) for the fourth comparative example was 21.6% as shown in FIG. 26 (see FIG. 26: ■1551). The power transmission efficiency in the antiphase resonance mode (fH) was 22.3% (see FIG. 26: ●1552).

In the fourth example (model A1), the power transmission efficiency in the inphase resonance mode (fL) was 88.5% (see FIG. 26: ■1651A1). Further, the power transmission efficiency in the antiphase resonance mode (fH) was 87.6% (see FIG. 26: ●1652A1). In the fourth example (model A2), the power transmission efficiency in the inphase resonance mode (fL) was 90.7% (see FIG. 26: ■1651A2). Further, the power transmission efficiency in the antiphase resonance mode (fH) was 87.0% (see FIG. 26: ●1652A2). In the fourth example (model A3), the power transmission efficiency in the inphase resonance mode (fL) was 92.9% (see FIG. 26: ■1651A3). Further, the power transmission efficiency in the antiphase resonance mode (fH) was 87.0% (see FIG. 26: ●1652A3). As should be understood from this, the wireless power transmission apparatus 1600 in the fourth example resulted in a better power transmission efficiency than that of the wireless power transmission apparatus 1500 in the fourth comparative example. That is, it should be understood that, with the provision of the magnetic members 1623 and 1633 as in the wireless power transmission apparatus 1600 improves the power transmission efficiency, as compared with the wireless power transmission apparatus 1500 in which the magnetic members 1623 and 1633 are not arranged on the inner circumferential surface sides of the power-supplying resonator 1522 and the power-receiving resonator 1532, even when the coil diameters of the power-supplying coil 1621 and the power-supplying resonator 1622 in the power-supplying module 1602, the power-receiving coil 1631 and the power-receiving resonator 1632 in the power-receiving module 1603 are different.

FIFTH EXAMPLE

In the above described wireless power transmission apparatus 200 or the like, the distance A between the power-supplying coil 21 and the power-supplying resonator 22 was set to 15 mm, the distance B between the power-receiving coil 31 and the power-receiving resonator 32 was set to 15 mm, and the distance C between the power-supplying resonator 22 and the power-receiving resonator 32 was set to 30 mm (see FIG. 2). The fifth example deals with a wireless power transmission apparatus in which the distance A between the power-supplying coil and the power-supplying resonator and the distance B between the power-receiving coil and the power-receiving resonator were set to 0 mm. In other words, in the apparatus of the fifth example, the power-supplying coil was arranged on the inner circumference side of the power-supplying resonator, and the power-receiving coil was arranged on the inner circumference side of the power-receiving resonator. Specifically, measurements of the transmission characteristic "S21" and the power transmission efficiency were conducted for a wireless power transmission apparatus 1800 and a wireless power transmission apparatus 1700 (Hereinafter, fifth comparative example). The wireless power transmission apparatus 1800 included: a power-supplying module in which a power-supplying coil was arranged on the inner circumference side of a power-supplying resonator, and a cylindrical magnetic member was arranged on the inner circumference side of the power-supplying coil; and a power-receiving module in which a power-receiving coil was arranged on the inner circumference side of the power-receiving resonator and a cylindrical magnetic member was arranged on the inner circumference side of the power-receiving coil. Meanwhile, no magnetic member was arranged in the wireless power transmission apparatus 1700.

(Structure of Wireless Power Transmission Apparatus 1700 Related to Fifth Comparative Example)

Figure 27:
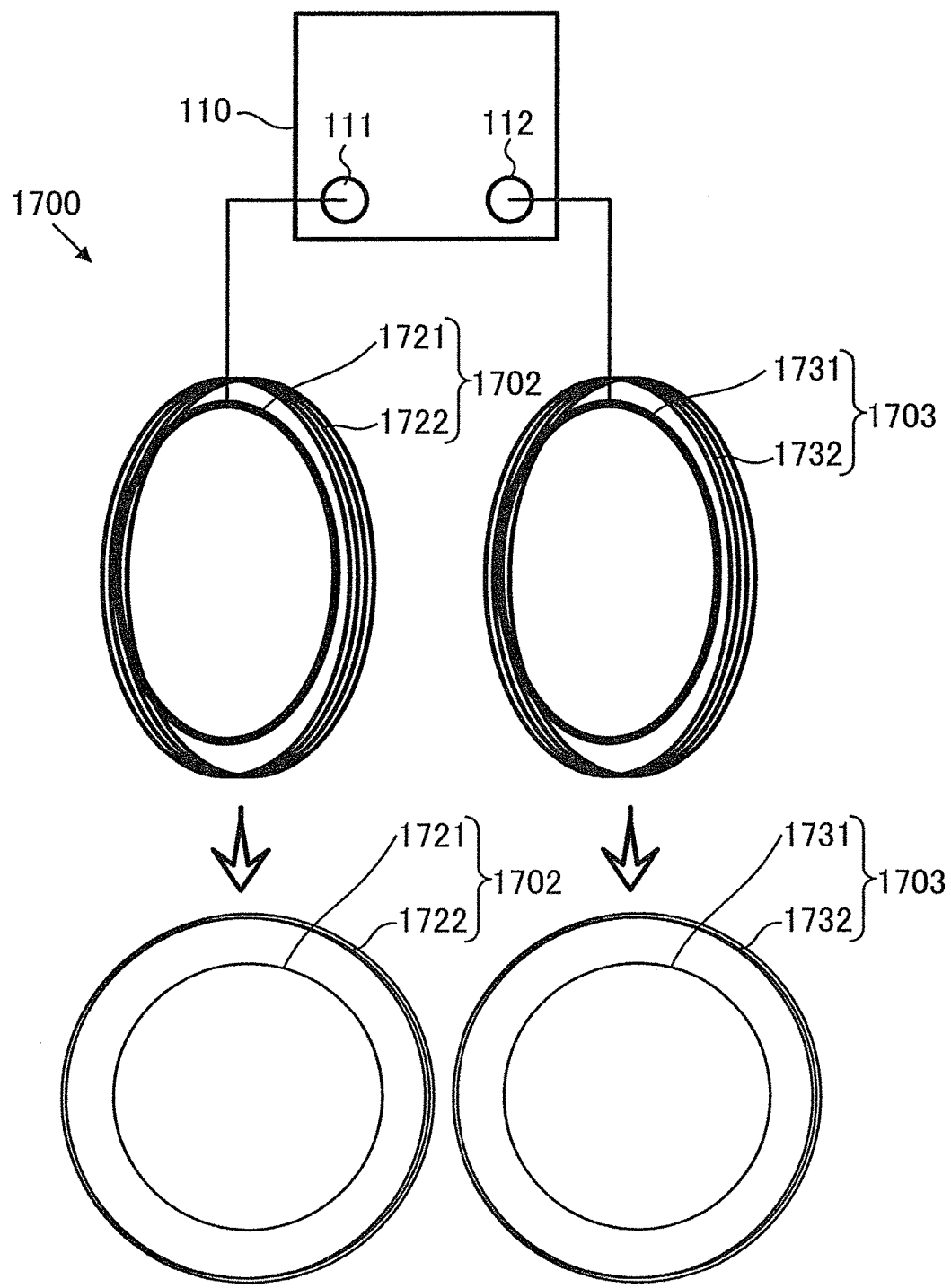
FIG. 27 is a diagram showing a structure of a wireless power transmission apparatus related to a fifth comparative example.

As shown in FIG. 27, the wireless power transmission apparatus 1700 used in the fifth comparative example included a power-supplying module 1702 having a power-supplying coil 1721 on the inner circumference side of a power-supplying resonator 1722, and a power-receiving module 1703 having a power-receiving coil 1731 arranged on the inner circumference side of a power-receiving resonator 1732. As in the first example, the power-supplying coil 1721 was connected to the output terminal 111 of the network analyzer 110, and the power-receiving coil 1731 was connected to the input terminal 112 of the network analyzer 110.

The power-supplying coil 1721 plays a role of supplying power obtained from the network analyzer 110 to the power-supplying resonator 1722 by means of electromagnetic induction. This power-supplying coil 1721 was formed by winding once a copper wire material (coated by insulation film) having a wire diameter of 1 mmϕ, and was formed in a circular shape with its inner diameter being 70 mmϕ.

The power-receiving coil 1731 plays a role of outputting the power transmitted as magnetic field energy from the power-supplying resonator 1722 to the power-receiving resonator 1732 to the input terminal 112 of the network analyzer 110 by means of electromagnetic induction. The power-receiving coil 1731 was formed by winding once a copper wire material (coated by insulation film) having a wire diameter of 1 mmϕ, and was formed in a circular shape with its inner diameter being 70 mmϕ.

The power-supplying resonator 1722 and the power-receiving resonator 1732 are each an LC resonance circuit, and play a role of creating the magnetic field resonant state. The power-supplying resonator 1722 and the power-receiving resonator 1732 each had a solenoid shape and were formed by winding three times a copper wire material (coated by insulation film) having a wire diameter of 1 mmϕ in the form of solenoid. The inner diameter was set to be 100 mmϕ. The resonance frequency was set to 12.9 MHz.

The distance between the power-supplying resonator 1722 and the power-receiving resonator 1732 was set 30 mm.

(Structure of Wireless Power Transmission Apparatus 1800 Related to Fifth Example)

Figure 28:
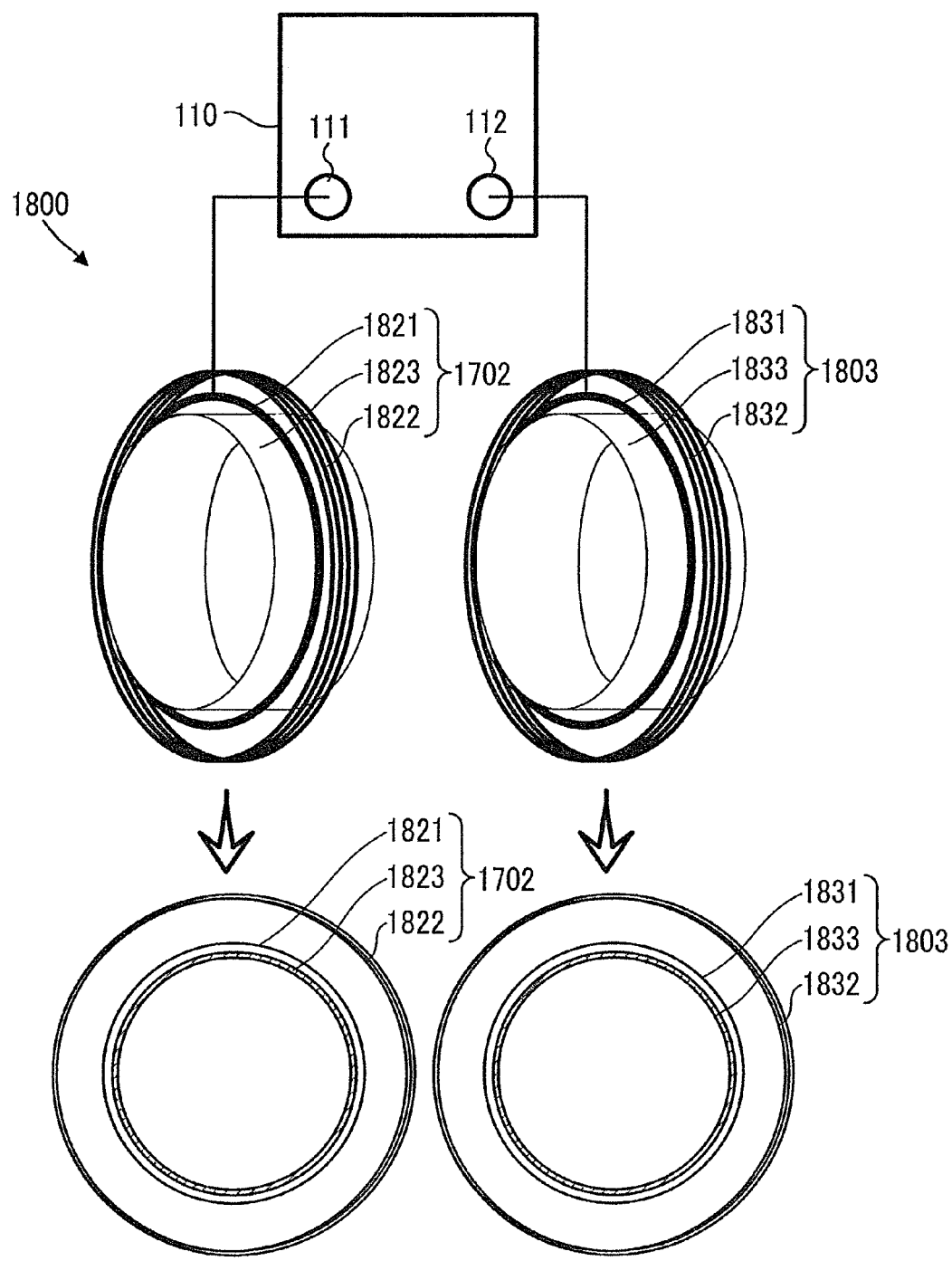
FIG. 28 is a diagram showing a structure of a wireless power transmission apparatus related to the fifth example.

As shown in FIG. 28, the wireless power transmission apparatus 1800 used in the fifth example included: a power-supplying module 1802 in which a power-supplying coil 1821 was arranged on the inner circumference side of the power-supplying resonator 1822 and a cylindrical magnetic member 1823 was arranged on the inner circumference side of the power-supplying coil 1821; and a power-receiving module 1803 in which a power-receiving coil 1831 was arranged on the inner circumference side of the power-receiving resonator 1832 and a cylindrical magnetic member 1833 was arranged on the inner circumference side of the power-receiving coil 1831. As in the fifth comparative example, the power-supplying coil 1821 was connected to the output terminal 111 of the network analyzer 110 and the power-receiving coil 1831 was connected to the input terminal 112 of the network analyzer 110.

The magnetic members 1823 and 1833 were formed by a resin in which magnetic powder was dispersed as in the case of the first example. The magnetic members 1823 and 1833 each had a cylindrical shape, with an inner diameter of 60 mmϕ, a height of 30 mm, and a thickness of 1 mm, and with its magnetic permeability being 100. The structures of the power-supplying coil 1821, the power-supplying resonator 1822, the power-receiving coil 1831, and the power-receiving resonator 1832, other than those described above, were the same as the structures in the wireless power transmission apparatus 1700 related to the fifth comparative example.

(Measurement Results of Fifth Comparative Example and Fifth Example)

The following describes the measurement results of the transmission characteristic "S21" for the wireless power transmission apparatus 1700 of the fifth comparative example, and those for the wireless power transmission apparatus 1800 of the fifth example.

First, using the network analyzer 110, the transmission characteristic "S21" of the wireless power transmission apparatus 1700 related to the fifth comparative example was measured with various frequencies of the AC power supplied to the wireless power transmission apparatus 1700. Similarly, the transmission characteristic "S21" of the wireless power transmission apparatus 1800 related to the fifth example was measured with various frequencies of the AC power to the wireless power transmission apparatus 1800.

Figure 29A:
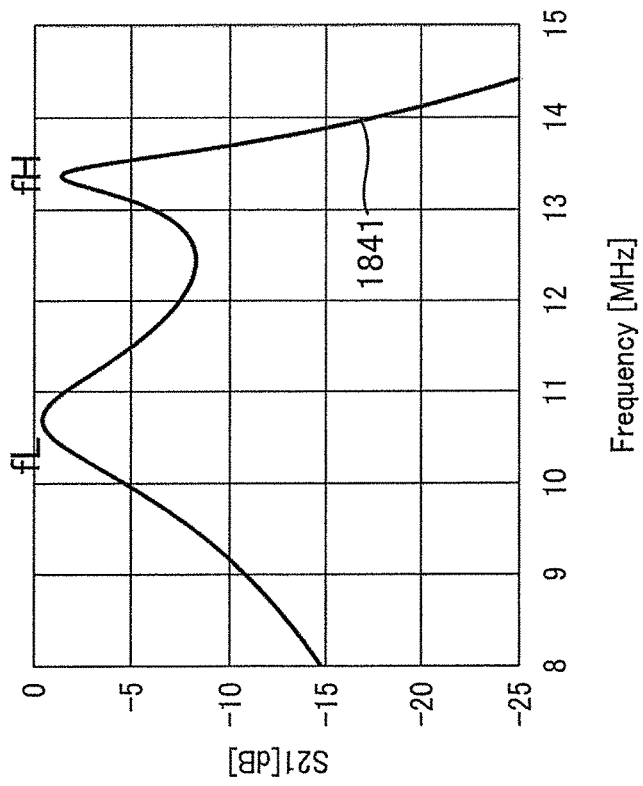
FIGS. 29(A) and 29(B) are graphs indicating the measurement results of the transmission characteristics S21 related to the fifth comparative example and the fifth example.

The measurement of the transmission characteristic "S21" in the fifth comparative example resulted in a waveform 1741 having separate peaks; one on a low frequency side and another on a high frequency side, as shown in FIG. 29(A). Of the separate peaks, the frequency on the high frequency side is indicated as fH, and the frequency on the low frequency side is indicated as fL.

Figure 29B:
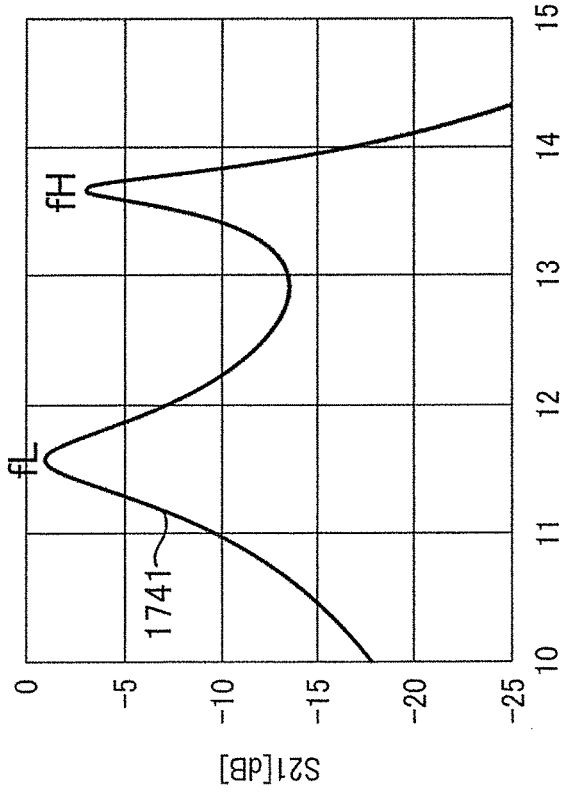

Meanwhile, the measurement of the transmission characteristic "S21" in the fifth example resulted in a waveform 1841 having separate peaks; one on a low frequency side and another on a high frequency side, as shown in FIG. 29(B). The value of the transmission characteristic "S21" at the frequency fH nearby the separated-peak on the high frequency side and the value of the transmission characteristic "S21" at the frequency fL nearby the separated-peak on the low frequency side were both higher than those in the resulting waveform 1741 (see FIG. 29(A)) in the fifth comparative example. As should be understood from this, the wireless power transmission apparatus 1800 of the fifth example results in a better power transmission efficiency than the wireless power transmission apparatus 1700 of the fifth comparative example. That is, it should be understood from the measurement results of the transmission characteristic "S21" that, even when the power-supplying coil 1821 is arranged on the inner circumference side of the power-supplying resonator 1822 and the power-receiving coil 1831 is arranged on the inner circumference side of the power-receiving resonator 1832, arrangement of the cylindrical magnetic member 1823 on the inner circumference side of the power-supplying coil 1821 and the cylindrical magnetic member 1833 on the inner circumference side of the power-receiving coil 1831 improves the power transmission efficiency, as compared with the wireless power transmission apparatus 1700 having none of the magnetic members 1823 and 1833 arranged on the inner circumferential surface sides of the power-supplying resonator 1722 and the power-supplying coil 1721 or on the inner circumferential surface side of the power-receiving resonator 1732 and the power-receiving coil 1731.

Figure 30:
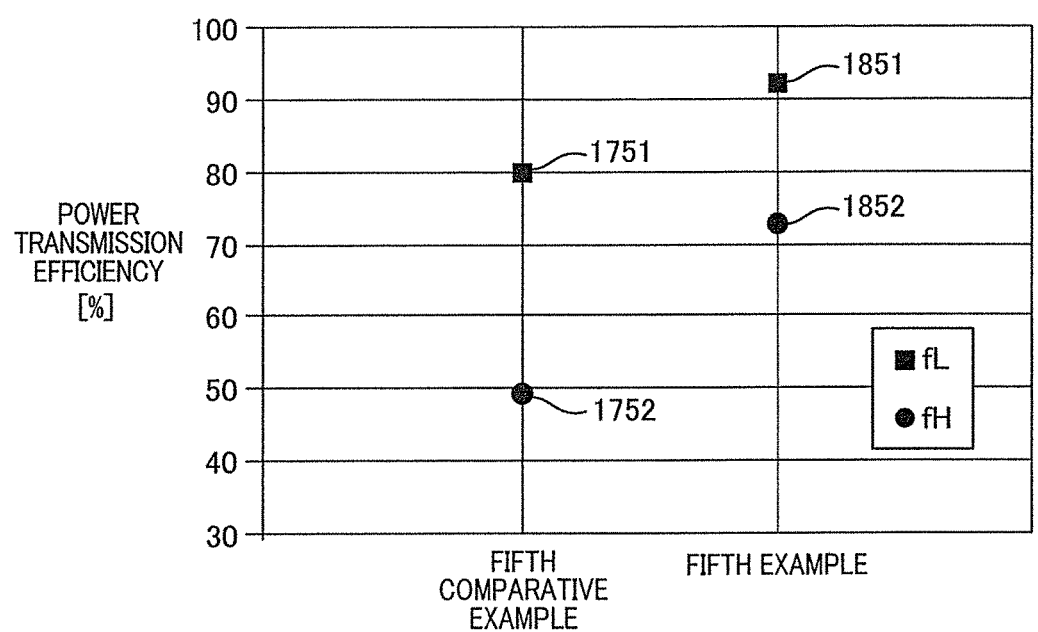
FIG. 30 is a graph indicating the measurement results of the power transmission efficiencies related to the fifth comparative example and the fifth example.

Using the network analyzer 110, measurement of the power transmission efficiency was conducted for the wireless power transmission apparatus 1700 related to the fifth comparative example, both in the inphase resonance mode and the antiphase resonance mode. In the meantime, measurement of the power transmission efficiency was conducted for the wireless power transmission apparatus 1800 related to the fifth example, both in the inphase and the antiphase resonance modes. The measurement results are shown in FIG. 30. Along the horizontal axis of the graph of FIG. 30, the results of the fifth comparative example and the fifth example are aligned. The vertical axis of the graph shows the resulting power transmission efficiency [%].

As the result of the measurement, the power transmission efficiency in the inphase resonance mode (fL) for the fifth comparative example was 80.3% as shown in FIG. 30 (see FIG. 30: ■1751). Further, the power transmission efficiency in the antiphase resonance mode (fH) was 49.0% (see FIG. 30: ●1752).

In the fifth example, the power transmission efficiency in the inphase resonance mode (fL) was 92.1% (see FIG. 30: ■1851). Further, the power transmission efficiency in the antiphase resonance mode (fH) was 72.6% (see FIG. 30: ●1852). As should be understood from this, the wireless power transmission apparatus 1800 of the fifth example results in a better power transmission efficiency than the wireless power transmission apparatus 1700 of the fifth comparative example. That is, provision of the magnetic members 1823 and 1833 as in the wireless power transmission apparatus 1800 improves the power transmission efficiency as compared with the case of the wireless power transmission apparatus 1700 having no magnetic members 1823 and 1833 on the inner circumferential surface side of the power-supplying resonator 1722 or on the inner-circumferential surface side of the power-receiving resonator 1732.

(Embodiment)

Next, an exemplary application of the wireless power transmission apparatus described in the above examples is described below as an embodiment.

For example, a wireless power transmission apparatus 200 includes a power-supplying module 202 having a power-supplying coil 21 and a power-supplying resonator 22, and a power-receiving module 203 having a power-receiving coil 31 and a power-receiving resonator 32. The power-supplying resonator 22 and the power-receiving resonator 32 are positioned so that the coil surfaces of the power-supplying resonator 22 and the power-receiving resonator 32 face each other. Further, on the inner circumferential surface sides of the coils of the power-supplying resonator 22 and the power-receiving resonator 32, cylindrical magnetic members 23 and 33 which cover the inner circumferential surfaces of the coils are arranged, respectively. In this embodiment, the power-supplying coil 21 of the power-supplying module 202 is connected, in place of the output terminal 111 of the network analyzer 110, to an AC power source via an oscillation circuit configured to adjust the frequency of power supplied to the power-supplying module 202. The power-receiving coil 31 of the power-receiving module 203 is connected, in place of the input terminal 112 of the network analyzer 110, to a rechargeable battery via a charging circuit configured to prevent overcharge and a rectifier/stabilizer circuit configured to rectify the AC power received.

In the wireless power transmission apparatus 200 of this embodiment, an oscillation circuit is accommodated on the inner circumference side of the power-supplying resonator 22 in the power-supplying module 202 (inner circumference side of the magnetic member 23), and the rectifier/stabilizer circuit is accommodated on the inner circumference side of the power-receiving resonator 32 in the power-receiving module 203 (inner circumference side of the magnetic member 33). Note that the charging circuit and the rechargeable battery may be accommodated on the inner circumference side of the power-receiving resonator 32 of the power-receiving module 203.

In the wireless power transmission apparatus 200 having the above-described structure, the AC power supplied from the AC power source to the power-supplying coil 21 via the oscillation circuit is supplied to and stored in the rechargeable battery via the rectifier/stabilizer circuit and the charging circuit, by means of the electromagnetic induction between the power-supplying coil 21 and the power-supplying resonator 22, the wireless transmission between the power-supplying resonator 22 and the power-receiving resonator 32 using the resonance (magnetic field resonant state), and the electromagnetic induction between the power-receiving resonator 32 and the power-receiving coil 31. In this power supply from the power-supplying resonator 22 to the power-receiving resonator 32 using the resonance, the power transmission efficiency of the power energy transmitted from the power-supplying module 202 to the power-receiving module 203 is improved as compared with a case where the magnetic members 23 and 33 are not arranged. In other words, it is possible to reduce the transmission loss in the wireless power transmission, and efficiently charge the rechargeable battery.

Note that the above embodiment deals with a case where the magnetic members 23 and 33 are arranged on the inner circumferential surface sides of the power-supplying resonator 22 and the power-receiving resonator 32, respectively; however, it is possible to arrange the magnetic members 24 and 34 on the outer circumferential surface side of the power-supplying resonator 22 and the power-receiving resonator 32, as in the wireless power transmission apparatus 300 of the example 2, or arrange the magnetic members 25 and 35 on the side surfaces of the power-supplying resonator 22 and the power-receiving resonator 32 as in the wireless power transmission apparatus 400 of the example 3. The arrangement, the sizes and the shapes of the magnetic member is suitably determined according to the size and costs of the power-supplying module 202 and the power-receiving module 203 to be manufactured.

In the above examples and the embodiments, the magnetic members 23 and 33, the magnetic members 24 and 34, or the magnetic members 25 and 35 are arranged in both the power-supplying module and the power-receiving module, respectively; however, the magnetic member may be arranged one of the power-supplying module and the power-receiving module.

The above examples and the embodiments describes, as an example, use of a technology for conducting wireless power transmission by having the power-supplying resonator of the power-supplying module and the power-receiving resonator 32 of the power-receiving module resonating each other to cause magnetic coupling (magnetic field resonance type wireless power transmission). However, as a technology for power transmission by varying the magnetic field between the power-supplying module and the power-receiving module, there is an electromagnetic induction type wireless power transmission technology which conducts power transmission by means of electromagnetic induction between coils (e.g., see PTL 1). In cases of adopting this electromagnetic induction type wireless power transmission technology, the magnetic member is arranged on the inner circumferential surface side, the outer circumferential surface side, and/or the side surface of the coils where the electromagnetic induction takes place.

In the above examples and embodiments, the magnetic member is arranged so as to cover the entire inner circumferential surface or the outer circumferential surface of the power-supplying resonator 22 and the power-receiving resonator 32. However, the magnetic member does not have to necessarily cover the entire inner circumferential surface or the outer circumferential surface, and the magnetic member may cover a part of the inner circumferential surface or the outer circumferential surface.

Although the above descriptions have been provided with regard to the characteristic parts so as to understand the invention more easily, the invention is not limited to the embodiment as described above and can be applied to the other embodiments and the applicable scope should be construed as broadly as possible. Furthermore, the terms and phraseology used in the specification have been used to correctly illustrate the invention, not to limit it. In addition, it will be understood by those skilled in the art that the other structures, systems, methods and the like included in the spirit of the invention can be easily derived from the spirit of the invention described in the specification. Accordingly, it should be considered that the invention covers equivalent structures thereof without departing from the spirit and scope of the invention as defined in the following claims. In addition, it is required to sufficiently refer to the documents that have been already disclosed, so as to fully understand the objects and effects of the invention.

REFERENCE SIGNS LIST

21 Power-Supplying Coil
22 Power-Supplying Resonator
23 Magnetic Member
31 Power-Receiving Coil
32 Power-Receiving Resonator
33 Magnetic Member
110 Network Analyzer
111 Output Terminal
112 Input Terminal
200 Wireless Power Transmission Apparatus
202 Power-Supplying Module
203 Power-Receiving Module

The invention claimed is:

1. A wireless power transmission apparatus configured to perform power transmission from a power-supplying module to a power-receiving module by producing resonance and thereby varying a magnetic field, comprising:
the power-supplying module having a coil-shaped power-supplying resonator;
the power-receiving module having a coil-shaped power-receiving resonator; and
a cylindrical magnetic member that covers at least a part of an inner circumferential surface of a coil shape of one of the resonators,
at least one of an electronic circuit and a rechargeable battery being provided in a cylinder of the cylindrical magnetic member.

2. The wireless power transmission apparatus according to claim 1, wherein a portion of the cylindrical magnetic member is arranged on a surface of the coil shape of the one resonator that faces away from another one of the resonators.

3. The wireless power transmission apparatus according to claim 1, further comprising:
a power-supplying coil in the power-supplying resonator; and
a power-receiving coil in the power-receiving resonator,
wherein power fed to the power-supplying coil is fed to the power-supplying resonator by means of electromagnetic induction, the power fed to the power-supplying resonator is transmitted as a magnetic field energy from the power-supplying resonator to the power-receiving resonator by having the power-supplying resonator resonating with the power-receiving resonator, and the power transmitted to the power-receiving resonator is fed to the power-receiving coil by means of electromagnetic induction, thereby performing power transmission.

4. The wireless power transmission apparatus according to claim 2, further comprising:
a power-supplying coil in the power-supplying resonator; and
a power-receiving coil in the power-receiving resonator,
wherein power fed to the power-supplying coil is fed to the power-supplying resonator by means of electromagnetic induction, the power fed to the power-supplying resonator is transmitted as a magnetic field energy from the power-supplying resonator to the power-receiving resonator by having the power-supplying resonator resonating with the power-receiving resonator, and the power transmitted to the power-receiving resonator is fed to the power-receiving coil by means of electromagnetic induction, thereby performing power transmission.

5. The wireless power transmission apparatus according to claim 3, wherein for one of the power-supplying module and the power-receiving module, the cylindrical magnetic member covers entire inner circumferential surfaces of both the coil shape of the resonator and the coil, or covers entire outer circumferential surfaces of both the coil shape of the resonator and the coil.

6. The wireless power transmission apparatus according to claim 4, wherein for one of the power-supplying module and the power-receiving module, the cylindrical magnetic member covers entire inner circumferential surfaces of both the coil shape of the resonator and the coil, or covers entire outer circumferential surfaces of both the coil shape of the resonator and the coil.

7. The wireless power transmission apparatus according to claim 1, wherein there is a distance between the cylindrical magnetic member and the inner circumferential surface of the coil shape.

8. The wireless power transmission apparatus according to claim 7, wherein the distance between the cylindrical magnetic member and the inner circumferential surface of the coil shape is 13 mm or less.

9. The wireless power transmission apparatus according to claim 7, wherein the distance between the cylindrical magnetic member and the inner circumferential surface of the coil shape divided by an inner diameter of the coil shape is less than or equal to 13/54.

* * * * *